US010356383B2

(12) United States Patent
Woodgate et al.

(10) Patent No.: US 10,356,383 B2
(45) Date of Patent: Jul. 16, 2019

(54) ADJUSTMENT OF PERCEIVED ROUNDNESS IN STEREOSCOPIC IMAGE OF A HEAD

(71) Applicant: REALD SPARK, LLC, Beverly Hills, CA (US)

(72) Inventors: Graham J. Woodgate, Henley-on-Thames (GB); Michael G. Robinson, Boulder, CO (US); Eric Sommerlade, Oxford (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 14/757,893

(22) Filed: Dec. 24, 2015

(65) Prior Publication Data
US 2016/0219258 A1 Jul. 28, 2016

Related U.S. Application Data

(60) Provisional application No. 62/096,819, filed on Dec. 24, 2014.

(51) Int. Cl.
*H04N 13/122* (2018.01)
*H04N 13/128* (2018.01)
(Continued)

(52) U.S. Cl.
CPC ....... *H04N 13/122* (2018.05); *H04N 5/23206* (2013.01); *H04N 7/144* (2013.01); *H04N 13/128* (2018.05); *H04N 13/194* (2018.05)

(58) Field of Classification Search
CPC ........... H04N 13/0018; H04N 5/23206; H04N 7/144; H04N 13/0022; H04N 13/0059
USPC ......................................................... 348/43
See application file for complete search history.

(56) References Cited

U.S. PATENT DOCUMENTS 1,128,979 A 2/1915 Hess
1,970,311 A 8/1934 Ives
(Continued)

FOREIGN PATENT DOCUMENTS

CN 1142869 A 2/1997
CN 1377453 A 10/2002
(Continued)

OTHER PUBLICATIONS

English Translation of Korean Publication KR10-2014-0139730 Dec. 2014.*

(Continued)

*Primary Examiner* — Loi H Tran
(74) *Attorney, Agent, or Firm* — Penny L. Lowry; Neil G. Mothew

(57) ABSTRACT

In telecommunication video calling and videoconferencing systems, it is strongly desirable for remote observers to interact with natural gaze cues. In natural gaze interaction, the camera for a source observer appears to be co-located in the eye region of a destination observer image and vice versa. The appearance of camera co-location is achieved for stereoscopic camera pair that are placed either side of an autostereoscopic 3D display. Such cameras typically provide stereoscopic images that have disparity distributions that provide unnatural perceived head roundness. The present embodiments achieve perceived head roundness that is closer to that expected in natural face to face interaction by modification of perceived local depth in detected regions of the head.

22 Claims, 30 Drawing Sheets

(51) Int. Cl.
  *H04N 13/194* (2018.01)
  *H04N 7/14* (2006.01)
  *H04N 5/232* (2006.01)

(56) References Cited

U.S. PATENT DOCUMENTS

| | | |
|---|---|---|
| 2,133,121 A | 10/1938 | Stearns |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 * | 9/2004 | Jones ............... H04N 13/0011 345/419 |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton et al. |
| 8,223,296 B2 | 7/2012 | Lee et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 9,197,884 B2 | 11/2015 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 * | 9/2005 | Jin ............... H04N 13/0018 345/419 |

(56) References Cited

U.S. PATENT DOCUMENTS

| | | |
|---|---|---|
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1* | 4/2010 | Robinson ............ G09G 3/003 348/47 |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0075285 A1 | 3/2012 | Oyagi et al. |
| 2012/0086776 A1 | 4/2012 | Lo |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0169838 A1 | 7/2012 | Sekine |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0011048 A1* | 1/2013 | Yamashita ......... H04N 13/0022 382/154 |
| 2013/0101253 A1 | 4/2013 | Popovich et al. |
| 2013/0107340 A1 | 5/2013 | Wong et al. |
| 2013/0135588 A1 | 5/2013 | Popovich et al. |
| 2013/0169701 A1 | 7/2013 | Whitehead et al. |
| 2013/0230136 A1* | 9/2013 | Sakaguchi ............. H04N 13/00 378/41 |
| 2013/0294684 A1* | 11/2013 | Lipton ............... H04N 13/0022 382/154 |
| 2013/0307831 A1 | 11/2013 | Robinson et al. |
| 2013/0307946 A1 | 11/2013 | Robinson et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0240828 A1 | 8/2014 | Robinson et al. |
| 2014/0340728 A1 | 11/2014 | Taheri |
| 2014/0368602 A1 | 12/2014 | Woodgate et al. |
| 2015/0334365 A1* | 11/2015 | Tsubaki ............. H04N 13/0022 348/51 |

FOREIGN PATENT DOCUMENTS

| | | |
|---|---|---|
| CN | 1454329 A | 11/2003 |
| CN | 1466005 A | 1/2004 |

(56) References Cited

FOREIGN PATENT DOCUMENTS

| | | |
|---|---|---|
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 202486493 U | 10/2012 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| JP | H08211334 | 8/1996 |
| JP | H08231691 A | 9/1996 |
| JP | H08254617 | 10/1996 |
| JP | H08340556 | 12/1996 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 2013015619 | 1/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 10-2014-0139730 A | 12/2014 |
| TW | 200528780 | 9/2005 |
| WO | 1994006249 B1 | 4/1994 |
| WO | 1995020811 A1 | 8/1995 |
| WO | 1995027915 A1 | 10/1995 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |

OTHER PUBLICATIONS

PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/021583 International search report and written opinion of international searching authority dated Sep. 10, 2015.
PCT/US2015/038024 International search report and written opinion of international searching authority dated Dec. 30, 2015.
Robinson et al., U.S. Appl. No. 14/751,878 entitled "Directional privacy display" filed Jun. 26, 2015. The application is available to Examiner on the USPTO database and has not been filed herewith.
Robinson et al., U.S. Appl. No. 15/097,750 entitled "Wide angle imaging directional backlights" filed Apr. 13, 2016. The application is available to Examiner on the USPTO database and has not been filed herewith.
Robinson et al., U.S. Appl. No. 15/098,084 entitled "Wide angle imaging directional backlights" filed Apr. 13, 2016. The application is available to Examiner on the USPTO database and has not been filed herewith.
Robinson, U.S. Appl. No. 13/300,293 entitled "Directional flat illuminators" filed Nov. 18, 2011. The application is available to Examiner on the USPTO database and has not been filed herewith.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
AU-2013262869 Australian Office Action of Australian Patent Office dated Feb. 22, 2016.
Bahadur, "Liquid crystals applications and uses," World Scientific, vol. 1, pp. 178 (1990).
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201380026047.9 Chinese 1st Office Action of the State Intellectual Property Office of P.R. dated Dec. 18, 2015.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
EP-07864751.8 European Search Report dated Jun. 1, 2012.
EP-07864751.8 Supplementary European Search Report dated May 29, 2015.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.

(56) References Cited

OTHER PUBLICATIONS

EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Feb. 1, 2016.
EP-13843659.7 European Extended Search Report of European Patent Office dated May 10, 2016.
EP-13844510.1 European Extended Search Report of European Patent Office dated May 13, 2016.
PCT/US2013/041683 International search report and written opinion of international searching authority dated Aug. 27, 2013.
JP-2013540083 Notice of reasons for rejection dated Jun. 30, 2015.
PCT/US2013/041655 International search report and written opinion of international searching authority dated Aug. 27, 2013.
PCT/US2013/041619 International search report and written opinion of international searching authority dated Aug. 27, 2013.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
PCT/US2013/041548 International search report and written opinion of international searching authority dated Aug. 27, 2013.
PCT/US2007/85475 International search report and written opinion dated Apr. 10, 2008.
PCT/US2013/041237 International search report and written opinion of international searching authority dated May 15, 2013.
PCT/US2009/060686 international search report and written opinion of international searching authority dated Dec. 10, 2009.
PCT/US2011/061511 International search report and written opinion of international searching authority dated Jun. 29, 2012.
PCT/US2011/061511 International Preliminary Report on Patentability dated May 21, 2013.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2015/000327 International search report and written opinion of international searching authority dated Apr. 25, 2016.

\* cited by examiner

ADJUSTMENT OF PERCEIVED ROUNDNESS IN STEREOSCOPIC IMAGE OF A HEAD

CROSS-REFERENCE TO RELATED APPLICATIONS

This application is related to U.S. Patent Application No. 61/835,923, entitled "Depth corrected autostereoscopic video conferencing apparatus and method thereof," filed Jun. 17, 2013, U.S. patent application Ser. No. 14/306,690, "Controlling light sources of a directional backlight," filed Jun. 17, 2014, all of which are incorporated herein by reference in their entireties.

TECHNICAL FIELD

This disclosure generally relates to capture and display of stereoscopic images of a head. This disclosure relates generally to electronic devices that have a stereoscopic pair of cameras that capture a stereoscopic pair of images for display stereoscopically or autostereoscopically. In some aspects, the disclosure relates to electronic devices that are telecommunication devices that can transfer captured images of this type over a telecommunication network.

BACKGROUND

Video calling and videoconferencing systems are an example of types of system that capture a stereoscopic pair of images (which may be referred to as a "stereo image") of a head. Such systems generally capture head images of source and destination observers. The source observer's head image is captured by a source camera and the source observer views an image on a source display of the destination observer's head. The destination observer's head image is captured by a destination camera and the destination observer views an image on a destination display of the source observer's head.

In natural face to face communication, it is strongly desirable for the source and destination observers to interact with correct gaze cues. In correct gaze interaction, the camera for the source observer appears to be co-located in the eye region of destination observer image and vice versa.

In a known arrangement, a camera and beam combiner such as a half silvered mirror may be positioned in front of the source display. The camera output aperture may be imaged by the beam combiner to be co-located in a region close to the destination observer eye image. The destination observer perceives an image of the source observer's eyes that was recorded from a location that is optically in proximity with the location of the destination observer's eyes. Such an arrangement can achieve natural gaze correction; however, is bulky and impractical for flat panel displays, particularly for mobile displays.

By comparison, in known 2D video calling mobile display systems, the source camera aperture location is positioned outside the active area of the display and is thus separated from the destination observer eye image locations and is not co-located in the region around the source observer's eyes.

The destination observer sees the source observer not appearing to look into their eyes when the source observer is looking at the eyes of the image of the destination observer.

In a stereoscopic video calling system, two cameras are placed outside the display active area. Viewed individually as 2D images, each of the stereoscopic pair of images has incorrect gaze as the cameras are not co-located in the area of the destination observer eye images.

BRIEF SUMMARY

Unexpectedly, it has been found that the fused stereoscopic image provides corrected gaze with cameras that are remote to the location of the image of the destination observer's eyes.

In practical display systems, the camera separation is determined by the lateral width of the display device. Typically, such a separation is greater than nominal eye separations. Such increased separation provides stereoscopic images with disparity ranges that distort the perceived roundness of the stereoscopic viewed image in comparison with the actual roundness of the actual head. Head roundness reproduction arises from the relationship between the width and perceived local depth of various face features. Distortion is perceived when the perceived local depth of features of a stereoscopically displayed image of a head does not scale properly with the width of those features that is scale in the same manner as when an actual head is viewed in real life. Such distortion makes the head look unnatural. For example, with typical capture and display systems, the nose may be perceived as being too long compared to the width, giving a "Pinocchio effect," or the side of the head may look too wide, giving a "pancake effect". Effects such as these are disconcerting for the viewer. Accordingly, head roundness reproduction, that is natural scaling of perceived local depth and width, is a desirable property for stereoscopic head viewing.

According to a first aspect of the present disclosure, there is provided a method of adjusting perceived roundness in a stereoscopic pair of images that image a head, the method comprising processing one or each image by the following steps: identifying at least one region of the image that images a part of the head; locally transforming the at least one region in a manner that adjusts the perceived local depth in accordance with expected local depth in the imaged part of the head.

This method may involve adjustment of the perceived local depth in accordance with expected local depth in an imaged part of the head. This may allow improvement of head roundness reproduction as follows.

The stereoscopic pair of images of source observer's head that have been captured by a source camera system including a stereoscopic camera pair have the following properties. The images provide left and right homologous points for parts of the head. The separation of the homologous points defines image disparity and depends on optical and spatial properties of the camera system, that is at least on camera separation, camera field of view and distance to the source observer from the source display. On display of the stereoscopic pair of images on a display system and viewing by a destination observer, the captured disparities are mapped to the destination display. On perceptual reconstruction by the destination observer, the displayed disparities map to perceived local depth that is further dependent on the optical and spatial properties of the display system that is at least on eye separation, image size and viewing distance.

Typically, the mapping between the depth of the actual source observer's head, and the perceived depth of the image of the source observer's head on the destination display is non-linear. That is, some regions of depth may be extended and other regions may be compressed in comparison to the width of the parts. Head roundness is thus different from that which would be expected for viewing of the real source observer by the real destination observer.

The relationship between the perceived local depth and the actual depth may be derived from known optical and spatial properties of the camera system and display system. This knowledge might be used, for example, to provide roundness in stereo images that are computer-generated from a model in which the actual depth of the features are known. However, in general, in the case of a captured stereo image, the actual depth of the features imaged in any given part of the stereo image is not known and constantly changes as the imaged scene changes.

However, the present method makes use of knowledge of the object being imaged, that is a head, which has a typical, predictable shape. Accordingly, the method involves identifying at least one region of the image that images a part of the head, for example a nasal region that images a part of the head including the nose, or a side region that images the side of the head. That part has an expected local depth, for example the local depth of a typical nose or a typical side of a head. The method takes advantage of this by locally transforming the at least one region in a manner that adjusts the perceived local depth in accordance with expected local depth in the imaged part of the head. This allows improvement of head roundness reproduction, by making the perceived local depth closer to the expected local depth.

The local transformation may adjust the perceived local depth by adjusting the disparity between the stereoscopic pair of images. Perceived depth of an object in a displayed stereoscopic pair of images is derived from the disparity of the object between the stereoscopic pair of images. Accordingly, the perceived local depth may be adjusted by adjusting the disparity in the identified region.

The local transformation may adjust the perceived local depth by re-sampling parts of a region that are occluded in the other image. In the case of imaging parts of a region that are occluded in the other image, those parts may be distorted by the optical and spatial properties of the camera system and display system resulting in incorrect perceived depth. Accordingly, the perceived local depth may be adjusted by re-sampling those parts of the region.

One region of the image that may be identified and locally transformed is a nasal region that images a part of the head including the nose.

Nose shape, orientation and size can be used as identifying characteristics for individuals in face to face communications. While size may vary greatly in human populations, it is desirable to provide perceived nose depth that is similar to that expected. Typically in stereoscopic video calling for hand held mobile display devices such as phones, tablets and laptops, the uncorrected mapping between actual source observer roundness and perceived roundness provides perceived extension of nose length, and may be termed a "Pinocchio effect". It is therefore advantageous to provide perceived nose length that is similar to that expected.

Further, it is desirable to achieve expected nose orientation for an observer that is consistent with expected gaze direction. Stereoscopic viewing of noses may advantageously achieve a perceived corrected nose orientation. Advantageously, the expected nose length may achieve improved gaze perception by optimizing perceived nose orientation.

In the case of using such a nasal region, the processing may be performed by further identifying a nasal end region that images the end of the nose, the nasal region encompassing the nasal end region, performing the local transformation of the nasal region by: translating the nasal end region; and re-sampling an outer region of the nasal region outside the nasal end region.

Translation of the end of the nose with respect to the eye locations adjusts the perceived depth of the end of the nose. The translation may be in a lateral direction that is in a direction parallel to the line joining the observer's pupils. The translation may typically be arranged to reduce disparity of the end of the nose with respect to the disparity of the eyes. The translation may be applied to left and right images. The outer region of the nasal region may be re-sampled to provide a perceived depth that varies across the nasal region; thus the mapping of the nasal region may provide a substantially continuous variation of depth with position in the nose, reducing the appearance of unnatural depth changes within the nasal region. Advantageously, the magnitude of the Pinocchio effect may be reduced and natural nose shape may be achieved.

Another region of the image that may be identified and locally transformed is a side region that images the side of the head closest to the image capture position of the image and extends to a boundary at the extremity of the head in the image.

In comparison to natural face-to-face viewing, the stereo camera stereo base of the source camera may be outside the range of eye separation in the human population. The side region of the head of the source observer that is closest to each source camera may be captured with a subtended larger angle than would be achieved for a human eye in natural viewing. In display on the destination display, the side region will have an extended width, which may be termed a "Pancake effect" as in 2D the region appears to be have been flattened. In stereo display, the Pancake effect increases the disparity for the side region in comparison to natural viewing. The perceived depth may thus be greater than the expected depth of the imaged part of the side of the head.

In the case of using such a side region the local transformation may be performed by translating the boundary of the side region at the extremity of the head in the image; and re-sampling the side region.

Translation of the boundary towards the centre-line of the head will reduce the disparity of the side region. As the greatest depth of the head is for the boundary region, the boundary may be given the greatest translation. Parts of the region that are closer to the centre line typically have less depth and may be translated less than the boundary region. Thus, a smooth disparity compensation may be achieved by re-sampling the side region. The perceived depth may be reduced by translation of the pixels of the side region such that the perceived depth is more similar to the expected depth for natural viewing.

In this case, the processing may further comprise filling the background of the image that is uncovered by re-sampling a region of the background outside the boundary of the side region.

The translation of the boundary region may uncover background regions from which insufficient or no image data was collected. Desirably, the uncovered background regions may be filled with image data. Advantageously, the appearance of the segmentation boundary between the head image and background image may be reduced. Desirably, the filled background may have similar content to the original background image to minimize the appearance of the segmentation region. The similar content may be provided by re-sampling neighbouring background image data.

The step of identifying at least one region of the image may comprise, detecting facial features of the imaged head in the image; and identifying the at least one region in relation to the detected facial features.

Known techniques to identify facial features of the imaged head in the image may compromise active shape models, active appearance models and other known modeling techniques that employ training of facial feature identification.

While it is possible in principle to process one of the images, preferably each image is processed.

In operation, typically a destination observer will inspect the image of eyes of the source observer that is between the left and right eye cameras of the source display. Thus, the Pinocchio and Pancake effects arise from each of the stereo cameras of the source display. Further, the alignment of the perceived gaze direction of the source observer may be substantially along the optical axis of the display. Desirably, corrections may be applied to both of the left and right images to change disparity so that the perceived depth is closer to the expected depth and the distortions are applied symmetrically about the optical axis to maintain the gaze direction consistent with facial features of the source observer. Advantageously, perceived image depth may maintain disparity by preferably processing both of the stereo images.

The local transformation may be performed in a manner that reduces the magnitude of the disparity between the stereoscopic pair of images by an amount that increases with the magnitude of an expected depth in the imaged part of the head with respect to a reference feature of the head, for example being the eyes of the head.

In operation, the images of the eyes of the source observer displayed on the destination display may be aligned by means of identifying eye regions for left and right eye images and providing alignment of at least one eye and preferably both eyes. Advantageously, the alignment achieves zero disparity at the plane of the observer eyes. Zero disparity advantageously achieves minimized visibility of cross talk from the display system at the eyes. As the eyes are high contrast regions and the point of most interest in natural gaze interaction, the image quality of the eyes for stereoscopic display may be maximised in comparison to other regions of the face and head.

Stereoscopic cameras typically provide larger stereo bases than that would be provided by natural viewing, meaning that the perceived local depth needs to be reduced. As the reference feature is displayed with zero disparity, features in front of the reference feature have positive disparity, whereas features behind the reference feature have negative disparity. This means that reduction of the perceived local depth is achieved by reducing the magnitude of the disparity between the stereoscopic pair of images by an amount that increases with the magnitude of an expected depth, so that the perceived local depth reduces both in front of and behind the reference feature.

The method may be applied to a stereoscopic pair of images that are transmitted over a telecommunication network to a destination telecommunication device for display thereon. In that case, the method may be performed in the destination telecommunication device, or elsewhere in the telecommunication network.

Alternatively or in combination, the method may be applied to a stereoscopic pair of images that are captured on a source telecommunication device for transmittal over a telecommunication network. In that case, the method may be performed in the source telecommunication device, or elsewhere on a device in the telecommunication network.

According to further aspects there may be provided: a computer program executable by a computer apparatus that is arranged on execution to cause the computer apparatus to perform a similar method; a computer program product storing such a computer program; or a computer apparatus to perform a similar method.

These and other advantages and features of the present disclosure will become apparent to those of ordinary skill in the art upon reading this disclosure in its entirety.

BRIEF DESCRIPTION OF THE DRAWINGS

Embodiments are illustrated by way of non-limitative example with reference to the accompanying drawings, in which.

DETAILED DESCRIPTION

Figure 1:
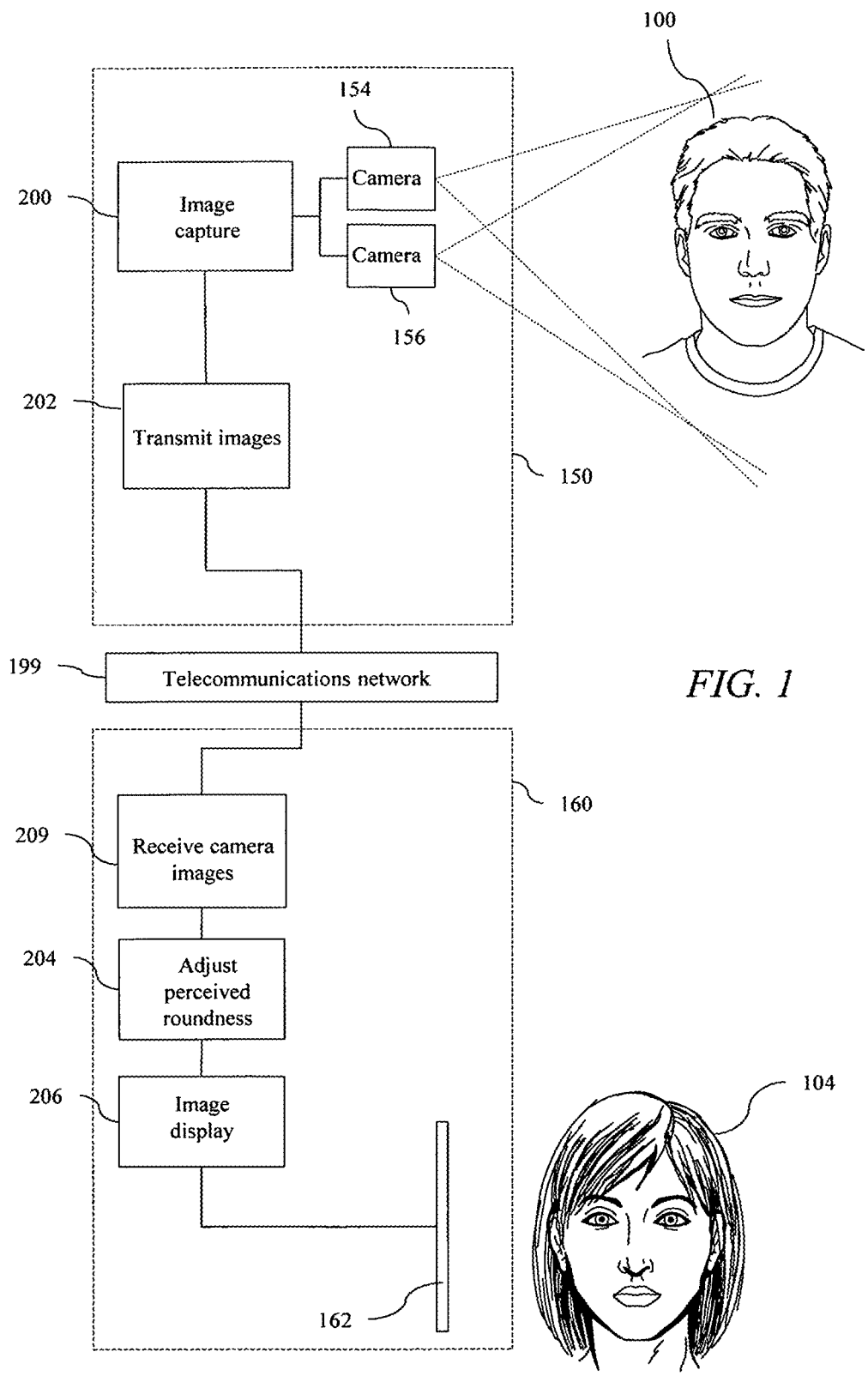
FIG. 1 is a schematic diagram illustrating a flow chart of a telecommunications system comprising a stereoscopic video calling system and arranged to adjust perceived roundness, according to the present disclosure.

In the following description, like reference numbers indicate similar parts, and for brevity the description thereof is not repeated.

Various hereinafter described embodiments relate to a telecommunication system including two telecommunication devices that communicate over a telecommunication network 199. In general, the communication may occur in both directions, as is conventional.

The telecommunication network 199 may be any type of telecommunication network over which images and other data may be transmitted, including but not limited to wired and wireless networks, cellular networks, TCP (Transmission Control Protocol)/IP (Internet Protocol) networks and other computer networks. The telecommunication network 199 may communicate over any type of transmission channel and may include plural networks of the same or different types in the path between the source telecommunication device 150 and the destination telecommunication device 160.

The telecommunication devices may be any devices suitable for communicating over the telecommunication network 199, typically with a network interface suitable for the type of telecommunication network 199.

The telecommunication devices may be mobile telecommunication devices that communicate wirelessly with a telecommunication network 199 that is wireless, for example a cellular network including base stations or a wireless computer network such as a WiFi, with which the telecommunication devices communicate wirelessly. Such wireless networks may include wired transmission paths, for example between the base stations in a cellular network as is conventional. Although this is not limitative, in the case of mobile telecommunication devices, the devices themselves are of limited size in order to allow for portability, for example of sizes typical for a mobile smartphone or tablet computer.

The hereinafter described embodiments relate to teleconferencing methods in which images that are captured and displayed are video images.

There are described some specific methods for communicating images that are implemented in the telecommunication systems, referring to the telecommunication devices by the labels "source" and "destination", with images being transmitted from the source telecommunication device to the destination telecommunication device being referred to as "delivery" images and the images being transmitted in the opposite direction from the destination telecommunication device to the source telecommunication device being referred to as "return" images. These labels are used merely for providing a clear description of the methods for communicating images. The same methods may be applied for communicating images in reverse direction in which case the labels "source", "destination", "delivery" and "return" are reversed. Where the methods are applied bi-directionally, the labels "source" and "destination" may be applied to both telecommunication devices, depending on the direction of communication being considered.

The hereinafter described embodiments include various elements in common. Such common elements are given the same reference numerals and, for brevity, the description thereof is not repeated but should be understood as applying to all embodiments in which the common element is present, subject to any subsequently described modifications.

FIG. 1 is a schematic diagram illustrating a flow chart of a telecommunications system comprising a stereoscopic video calling system and arranged to adjust perceived roundness.

Source observer 100 and destination observer 104 are arranged to communicate over the telecommunications network 199 with source and destination telecommunications devices 150, 160 respectively.

In a forward path, stereoscopic images of destination observer 104 are captured by left camera 154 and right camera 164 of the source stereoscopic camera of the source telecommunications device 150. The source telecommunications device 150150 may further compromise other cameras for example to provide different perspective views of the destination observer 104. Image transmit step 202 may be arranged to direct images to a telecommunications network 199.

The destination telecommunications device 160 may compromise image receive step 209, image processing step 204 that may adjust perceived roundness of the image of the destination observer 104 to the source observer 100, display drive step 206 and stereoscopic display 162 that is preferably an autostereoscopic glasses free display.

In this manner a stereoscopic image of a source observer 100 may be relayed to a remote destination observer 104 so that appropriate gaze cues are presented and facial features have a perceived roundness that is closer to the expected roundness in comparison to the images captured by cameras 164, 166. Advantageously, the shape of the observer's head is provided with greater reliability to the source observer.

Figure 2:
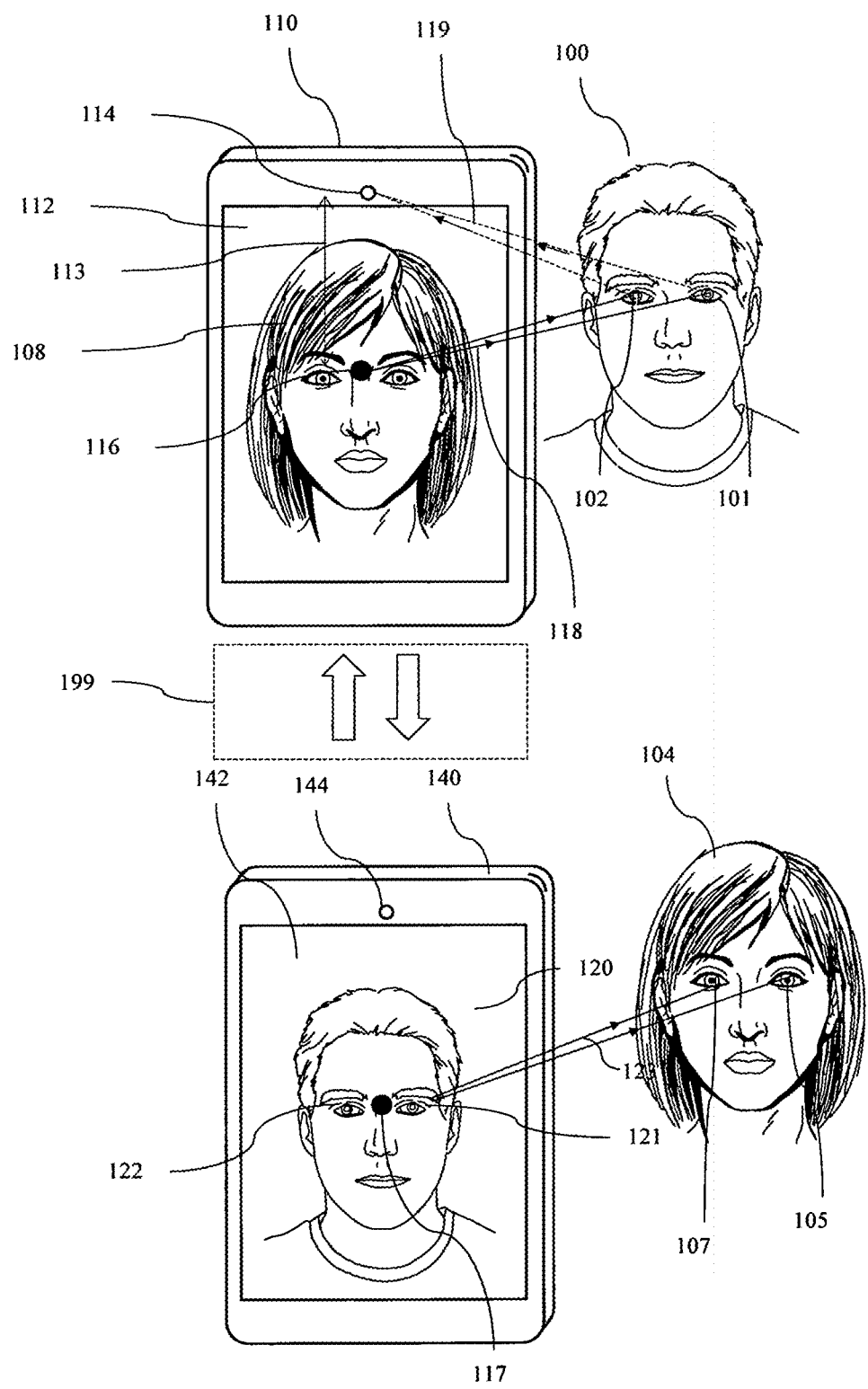
FIG. 2 is a schematic diagram illustrating a front view of a telecommunications system comprising 2D displays and single cameras, in accordance with the present disclosure.

FIG. 2 is a schematic diagram illustrating a front view of a source telecommunication device 110, and a destination telecommunication device 140 comprising a single camera 144 of a telecommunication system. The source telecommunication device 110 includes a single camera 114 and a display device 112 that is observed by a source observer 100. Similarly, the destination telecommunication device 140 includes a single camera 144 and a display device 142 observed by a destination observer 104. For clarity, the source observer 100 and the destination observer 104 are shown in a reversed orientation here and in other drawings.

The source telecommunication device 110 and the destination telecommunication device 140 are capable of communication over a telecommunication network 199. Images are transmitted over the telecommunication network 199 as follows in a teleconferencing method. The source telecommunication device 110 transmits delivery images 120 captured by its camera 114 to the destination telecommunication device 140 which displays the delivery images 120 on its display device 142. Similarly, the destination telecommunication device 140 transmits return images 108 captured by its camera 144 to the source telecommunication device 110 which displays the return images 108 on its display device 112.

In the source telecommunications device 110 the monoscopic (single lens) camera 114 is positioned above the display device 112. A point of interest 116 on a return image 108 displayed on the display device 112 is observed by left eye 101 and right eye 102 of the source observer 100. The point of interest 116 may be located on a return image 108 comprising the face of the destination observer 104, for example being typically the location between the eyes 105, 107 of the destination observer 104. As the camera 114 is positioned above the display device 112, the point of interest 116 may be displaced by a vertical distance 113 from the camera 114. Light rays from the point of interest 116 on the display device 118 to the eyes 101, 102 of the source observer 100 thus have a substantially different directionality to light rays 119 from the eyes 101, 102 to the camera 114.

Destination telecommunications device 140 includes a display device 142 and a camera 144. The delivery image 120 of the source observer 100 captured by the camera 114 of the source device 110 is displayed on the destination display device 142 with point of interest 117 that may be between the eyes 121, 122 of the source observer 100 in the delivery image 120. The destination observer 104 with left and right eyes 105, 107 respectively may observe the point of interest 117 and would desirably receive a source image that appears to be looking into the eyes of the destination observer. However, because of the difference in direction of rays 118, 119 at the source telecommunications device 110, the source observer 100, as observed by the destination observer 104 observing the delivery image 120, appears to be looking below the direction of the destination observer's line 123 of gaze to the point of interest 122.

The human visual system has evolved high sensitivity to the cues gained from the relative position of the iris and white sclera of other observers during social interaction. Small errors in the perceived gaze direction can create unnatural interactions. The perceived effect of the source observer 100 appearing to have a downwards gaze is highly disconcerting to the destination observer 104 and impacts on the ability of the source observer 100 and destination observer 104 to communicate with each other, thereby reducing the efficacy of the telecommunication system in providing teleconferencing. It would be desirable to achieve corrected gaze for observers connected by means of telecommunication devices.

Figure 3:
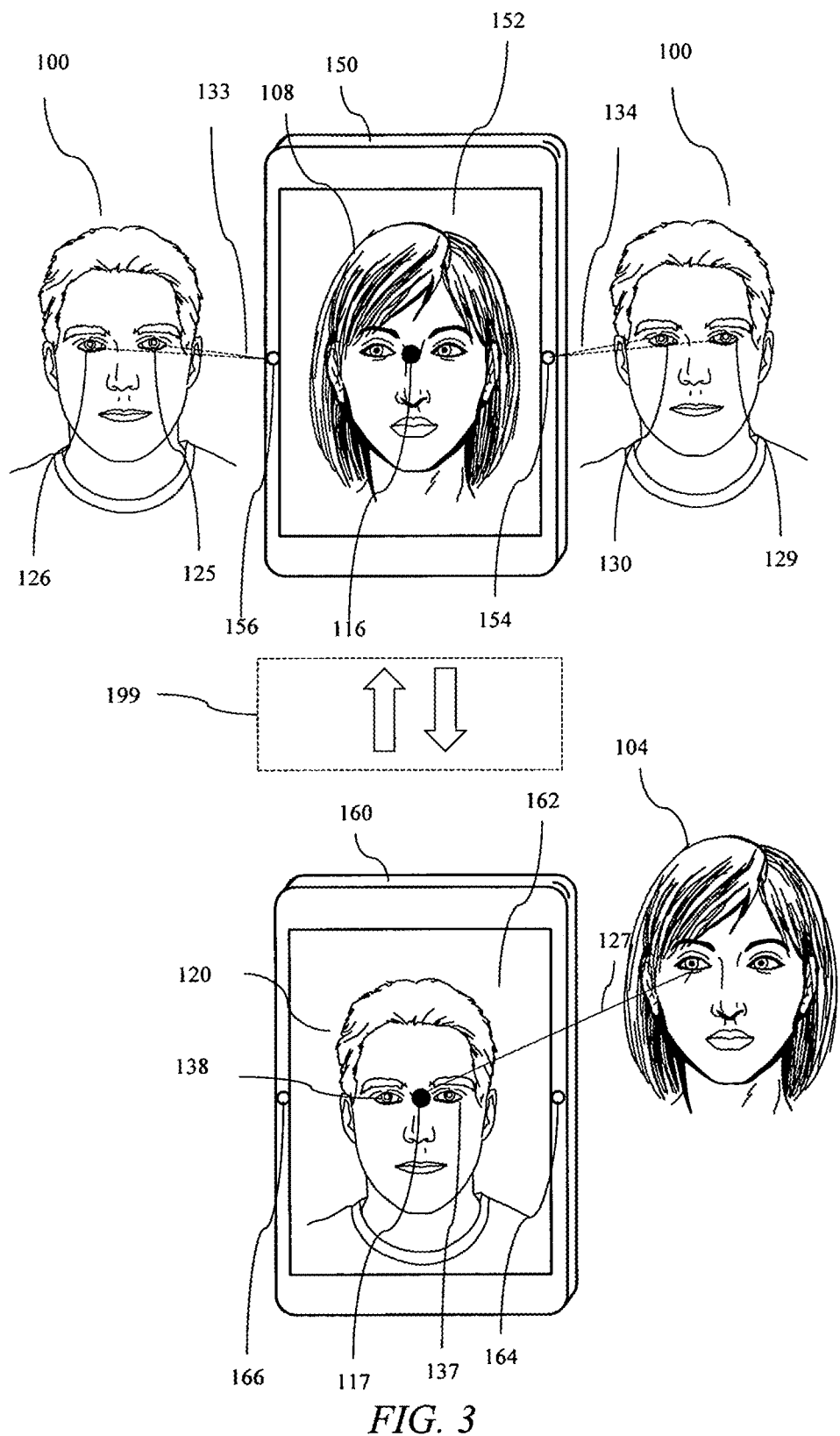
FIG. 3 is a schematic diagram illustrating a front view of a telecommunications system comprising autostereoscopic 3D displays and stereoscopic cameras, in accordance with the present disclosure.

FIG. 3 is a schematic diagram illustrating a front view of a source telecommunication device 150 and a destination telecommunication device 160 of a telecommunication system. The source telecommunication device 150 includes a stereoscopic pair of cameras 154, 156 and autostereoscopic display device 152 that is observed by a source observer 100. Similarly, the destination telecommunication device 160 includes a stereoscopic pair of cameras 164, 166 and an autostereoscopic display device 162 observed by a destination observer 104. The autostereoscopic display devices 152 and 162 are capable of displaying stereo images autostereoscopically, so that the source observer 100 and destination observer 104 perceive the stereo images with a stereoscopic effect.

The source telecommunication device 150 and the destination telecommunication device 160 are capable of communication over a telecommunication network 199. Here, and in the hereinafter described embodiments, images are transmitted over the telecommunication network 199 as follows in a teleconferencing method. The source telecommunication device 150 transmits stereo delivery images 120 captured by its stereoscopic pair of cameras 154, 156 to the destination telecommunication device 160 which displays the delivery images 120 on its display device 162. Similarly, the destination telecommunication device 160 transmits stereo return images 108 captured by its stereoscopic pair of cameras 164, 166 to the source telecommunication device 150 which displays the return images 108 on its display device 152.

In the source telecommunication device 150, the stereoscopic pair of cameras 154, 156 are positioned outside opposed sides of the display device 152, being the vertical sides in FIG. 3, at the same level partway along those sides. The cameras 154, 156 of the source telecommunications device 150 may respectively capture a right image 133 with right eye iris and sclera structures 125, 126, and a left image 134 with left eye iris and sclera structures 129, 130, the right and left images 133, 134 being a stereoscopic pair of images.

The stereo delivery image 120 may comprise left and right eye delivery images 137, 138, corresponding to the left and right images 124 and 126 respectively, that are displayed on the display device 162 autosterescopically. The destination observer 104 observes a point of interest 117 on the display device 162 that is typically located between the eyes of the source observer 100 in the delivery image 120. Considering the horizontal direction, the destination observer 104 looking at the point of interest 117 along ray 127 will perceive a three dimensional image that is analogous to the real world social interaction, that is a stereoscopic image of the sclera and irises for each eye, in particular with respect to the structure of the remainder of the face. While each of the stereo pair images by themselves when viewed in 2D do not show corrected gaze, the human visual system has evolved to provide high discrimination of gaze direction for stereo imagery and thus gaze cues are achieved, providing a highly natural interaction medium. Thus, the destination observer 104 perceives that the source observer 100 has a gaze directed in his own horizontal direction.

For gaze corrected video calling apparatus it would be desirable to provide an autostereoscopic display wherein the source/destination observers do not wear special glasses in order to see eyes of the destination/source observers respectively. Further the cameras of the stereoscopic cameras 164, 166 may be used to provide information for observer tracking as will be described.

Figure 4:
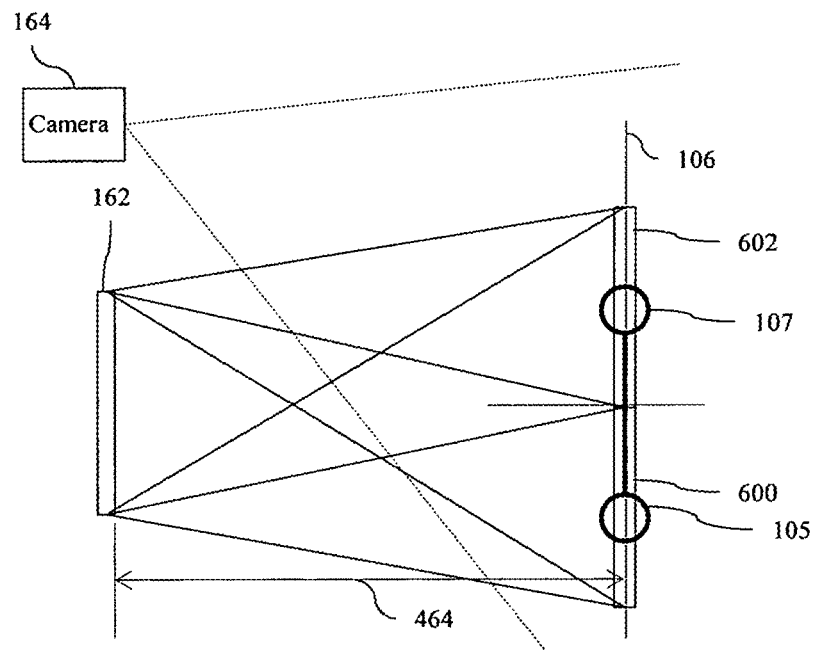
FIGS. 4-5 are schematic diagrams illustrating top views of an autostereoscopic display device using observer tracking that may optionally be implemented in the source and destination telecommunication devices, in accordance with the present disclosure.
Figure 5:
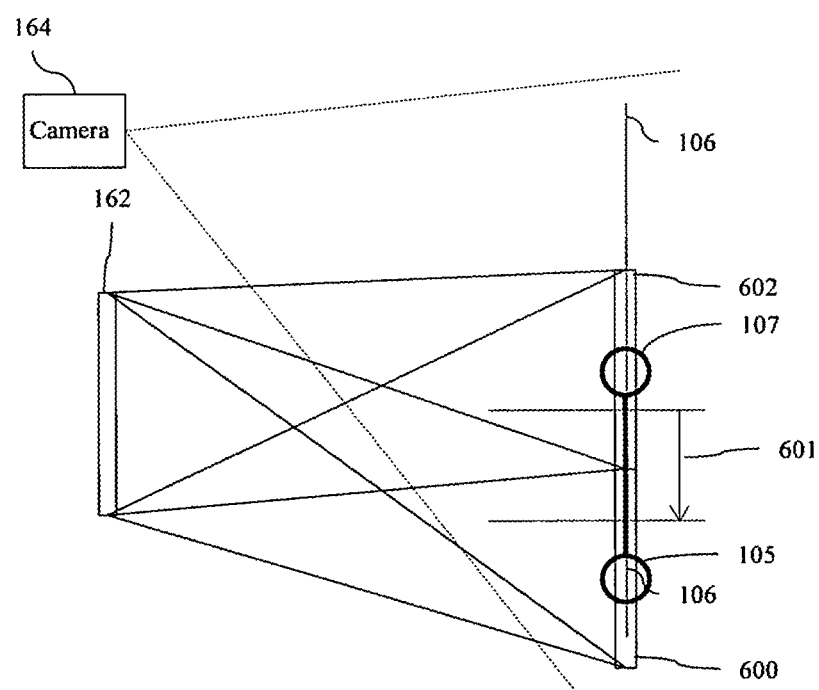

FIGS. 4-5 are schematic diagrams illustrating top views of an autostereoscopic display device 162 using observer tracking that may optionally be implemented in the source and destination telecommunication devices 150, 160. FIG. 4 illustrates the case of a first observer location. Eyes 105, 107 of the destination observer 104 are located in viewing windows 600, 602 that are located at a window plane 106 located at a nominal viewing distance 464 from the display device 162. If an observer's eye is within a viewing window then a single image is seen across the whole of the autostereoscopic display device 162. If the observer' eyes move out of the viewing window, no autostereoscopic image or an incorrect image is seen. To achieve enhanced viewing freedom, an observer tracking system may be arranged making use of at least one camera 164 of the destination telecommunication device 160. Thus for a movement 601 of the observer, the viewing windows may be adjusted in lateral position to correctly align the viewing windows 600, 602 with the observer's eyes 105, 107 respectively.

The display device 162 may compromise various types of autostereoscopic display system including, but not limited to lenticular screen, parallax barrier and directional backlight displays. The display device 162 may be of the type disclosed in US-2012/127573, which is incorporated herein by reference.

Figure 6:
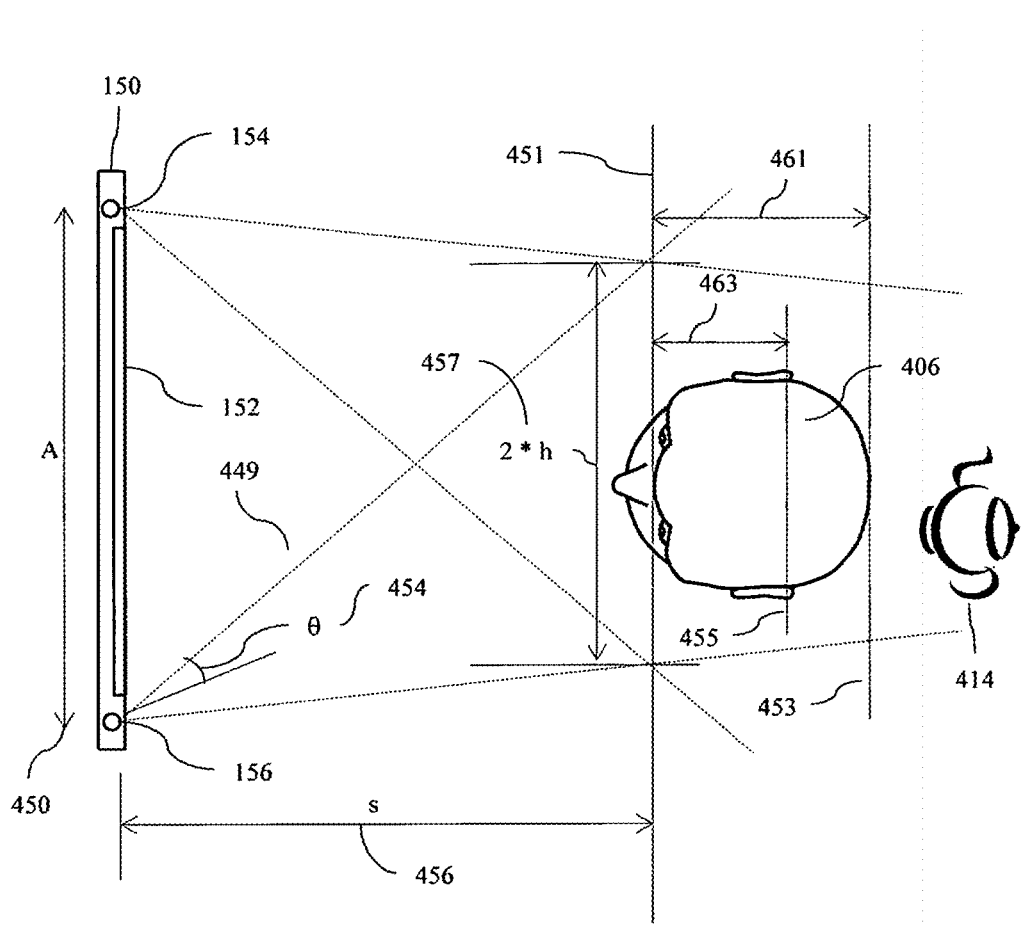
FIG. 6 is a schematic diagram illustrating the top view of the capture conditions of an observer in a stereoscopic camera of a source device, in accordance with the present disclosure.

FIG. 6 is a schematic diagram illustrating the top view of the capture conditions of an observer 406 by a stereoscopic pair of cameras 154, 156 of a source telecommunication device 1150. The source telecommunication device 150 includes the stereoscopic pair of cameras 154, 156 with separation 450 of length A and an autostereoscopic display device 152. The cameras 154, 156 are arranged to capture the stereo delivery images (which may comprise left and right images) of a source observer 406 located in front of a background 414. The cameras 154, 156 have substantially the same lateral cone half-angle 454 of capture of size $\square$. The capture half-angle 454 is half the lateral angle of the field of view of the cameras 154, 156. The source observer 406 may be arranged at a nominal distance 456 of length s from the autostereoscopic display device 152, which may be for example the window plane 106 as described in FIG. 4.

Typical parameters for optical systems of autostereoscopic display devices and for relevant physiological characteristics of human observers are as follows. Typically the optical system of autostereoscopic display devices are designed, taking into account typical physiological characteristics of human observers, to achieve a window plane 106 at a distance 456 that is the most comfortable viewing distance for the majority of viewing population.

The window plane of an autostereoscopic display is the distance at which respective light sources of the autostereoscopic display are imaged for substantially all points across the width of the display. Thus an observer with an eye in the image of a light source, termed the optical window, sees the same image across the whole width of the display. The light sources may be formed from an array of pixels of a spatial light modulator in a spatially multiplexed display such as a lenticular or parallax barrier display; or may be individual light emitting elements in a temporally multiplexed display. The optical system of the autostereoscopic system (such as the lenticular screen, parallax barrier or optical valve) is arranged so that light sources are imaged from the centre of the display in a first direction and light sources are imaged from points away from the centre of the display in different controlled directions. The images from each point of the display overlap such that optical windows are formed at the intersection of said directions from points across the width of the display. The distance between the display and the optical windows is the nominal viewing distance of the display.

For example, the window plane of mobile devices of display diagonal size in the range 3-10" may be arranged at 300 mm for most adult observers, although may be 200-250 mm for children. For larger display devices such as for laptop or monitor display devices of display diagonals in the range 15-24", the optimum viewing distance may be increased to 400-700 mm. The window distance can thus be considered the optimum capture distance and replay distance of the respective display system.

The region of interest for providing roundness of replayed images will now be considered. This may include but is not limited to the regions between the front of the nose and eyes, front of nose and ears or Glabella and rear of head. In the human population, the distance 461 may be defined as the distance of the plane 451 of the Glabella to the plane 453 of the back of the head and may be 20 cm for the $50^{th}$ percentile in men and 19 cm for the $50^{th}$ percentile in women. Ignoring small children, the bounds of distance may be considered approximately 17 cm to 22 cm. The distance 463 from the plane 451 of the Glabella to the plane 453 of the rearmost visible part of the head may thus be considered to be approximately 10 cm and may be bounded by a few cm either side across the human population.

The typical eye separation 460 of size E for the human population may be 62 mm, with a typical maximum of 68 mm for large adults and a typical minimum of 55 mm for small children.

In typical front facing cameras for cell phone and tablet applications, the angular field of view may be set to be +/−20°. This can achieve a width of view h of size h of +/−110 mm at a 300 mm nominal viewing distance. As display size varies it may be desirable to fix the angular field of view of the cameras 154, 156, or it may be desirable to fix the lateral width of view.

Figure 7:
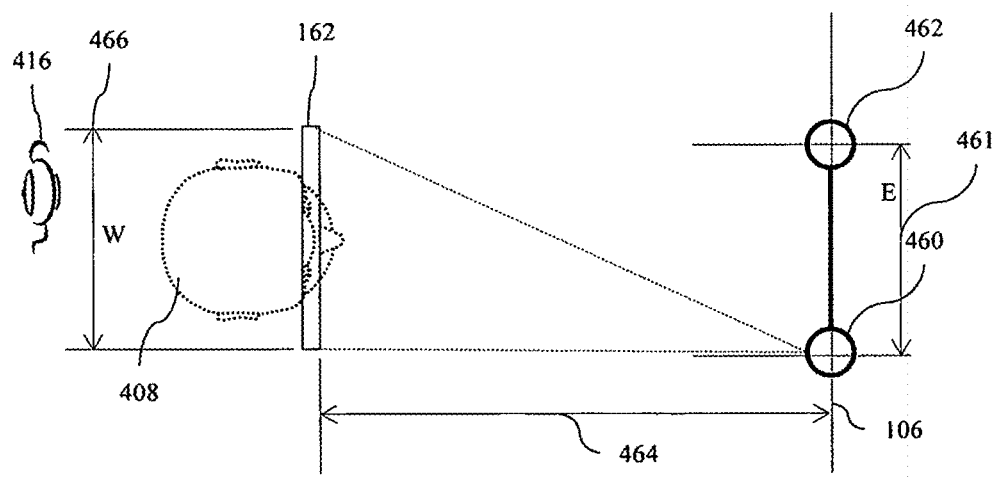
FIG. 7 is a schematic diagram illustrating the top view of the image replay conditions of the captured observer in an autostereoscopic display of a destination device, in accordance with the present disclosure.

FIG. 7 is a schematic diagram illustrating the top view of the image replay conditions of the image 408 of the source observer 406 and the image 416 of the background 414 in an autostereoscopic display device of a destination device. Thus a destination observer with left eye 460 and right eye 462 with separation 461 of size E may be arranged at distance 464 that is nominally the same as distance 456, being of length s. The destination observer may observe the destination autostereoscopic display device 162 with width 466, perceiving the autostereoscopic image 408 of the source observer 406 and image 416 of the background 414.

In operation as telecommunications devices, and in particular mobile telecommunications devices, both the source and destination telecommunication devices 150 and 160 may be typically arranged to have substantially the same camera separation 450 of size A which is slightly larger than the display width, W. In an illustrative example, the camera separation may be considered to be an oversize factor δ that may be 5% so that the camera separation is 105% of the display width. The oversize parameter arises from the finite width of the bezel of the optical system comprising the edges of the spatial light modulator of a display system and the width of the respective autostereoscopic optical components. Thus, the size A and width W are similar with size A being slightly larger than width W. In an illustrative embodiment a display of diagonal 5" and aspect ratio 4:3 arranged in portrait orientation may have a display aperture width W of 3". The bezel width may be 2 mm on each side and each camera may have a body width of 2 mm with a centrally aligned camera aperture in the camera body. The camera separation may thus be 82 mm, and the oversize parameter, δ may be 0.07.

Desirably a linear mapping between original image depth and perceived depth may be provided. Herein, the term "local depth" refers to the difference in absolute depth between two points in the object, or in the image.

Figure 8A:
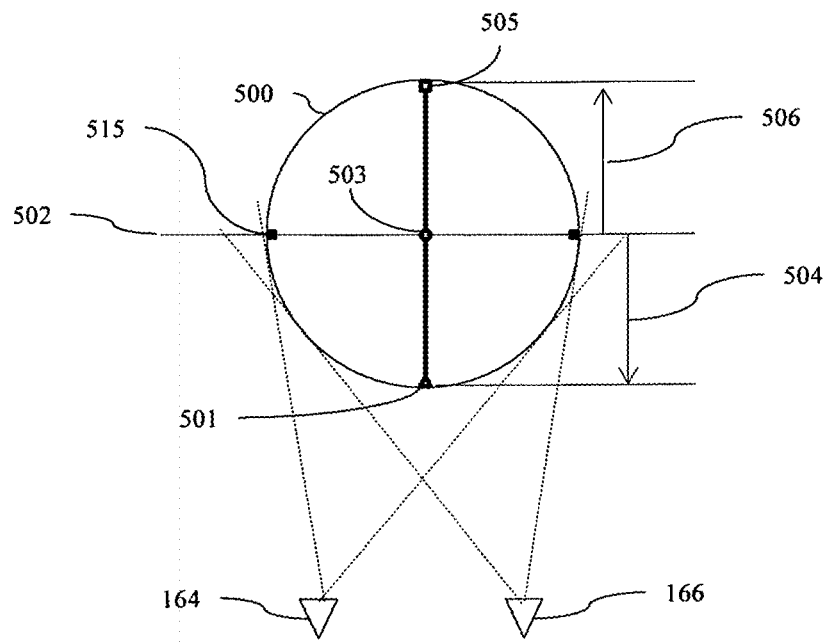
FIGS. 8A-8B are schematic diagrams illustrating the top view of an image capture arrangement, in accordance with the present disclosure.
Figure 8B:
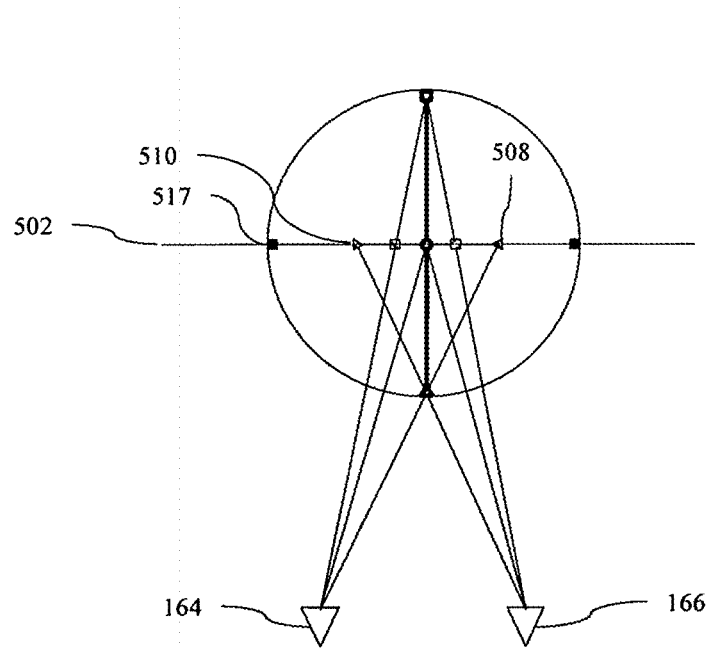

FIGS. 8A-8B are schematic diagrams illustrating the top view of an image capture arrangement. FIG. 8A shows the arrangement of an object with respect to cameras 164, 166 that are arranged to image a circular object 500 with near point 501, mid-point 503 arranged in plane 502 and far point 505, such that local depths 504 and 506 are equal. Circle edges in the plane 502 are shown by points 515. FIG. 8B illustrates the formation of homologous points. During capture the object 500 is imaged to respective set 508 and set 510 of homologous points, with homologous points for mid-point 503 and homologous points 517 for edge points 515 being overlapping in left and right images.

Figure 9:
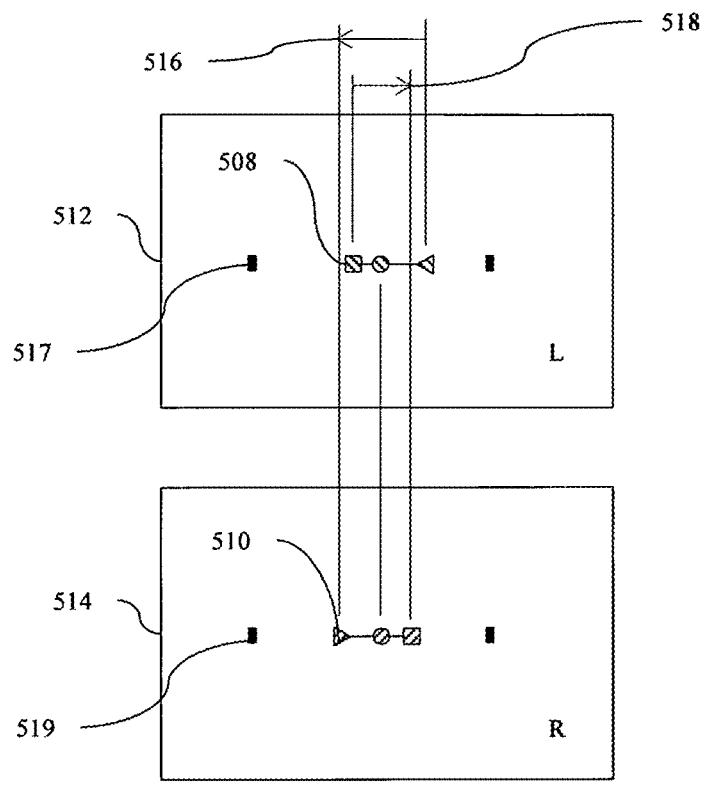
FIG. 9 is a schematic diagram illustrating a stereoscopic image pair for the captured images of FIGS. 8A-8B, in accordance with the present disclosure.

FIG. 9 is a schematic diagram illustrating a stereoscopic image pair for the captured images compromising the set of homologous points of FIG. 8B. FIG. 9 illustrates the appearance of homologous points 508, 510 and disparities for the left image (L) and right image (R) captured with the arrangement of FIG. 8B. In this case, the point illustrated by a circle is a reference feature that is displayed with zero disparity. This is achieved stereoscopically by displaying the stereoscopic pair of images with an overall disparity that provides a disparity of zero for that reference feature. Thus the near point 501 is represented by a negative disparity 516 and the far point 505 is represented by a positive disparity 518.

Figure 10:
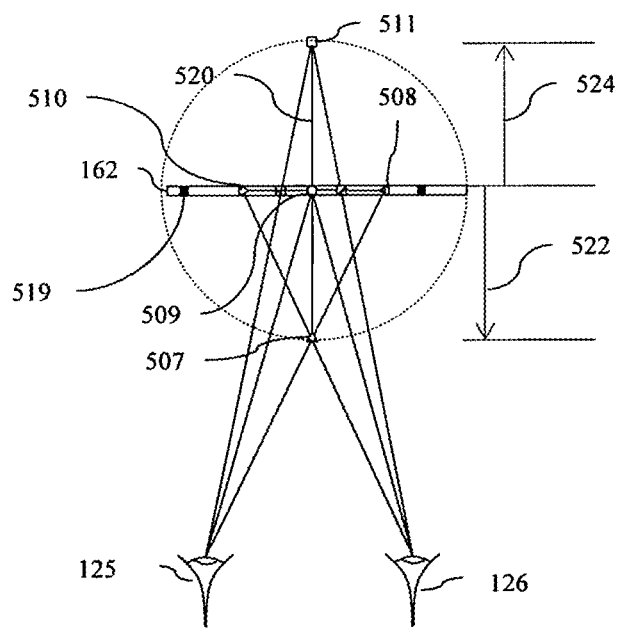
FIG. 10 is a schematic diagram illustrating mapping of depth between a capture arrangement and a replay arrangement, in accordance with the present disclosure.

FIG. 10 is a schematic diagram illustrating mapping of depth between a capture arrangement and a replay arrangement. FIG. 10 illustrates the perceived depth for the left and right images of FIG. 9. Display 162 is viewed by an observer's left eye 125 and right eye 126. If the angular size of the homologous point sets 508, 510 to the observer is the same for each eye as that which was captured by each of the respective cameras 164, 166 then the replayed object 520 with near, mid and far points 507, 509, 511 will have a 1:1 mapping to the original object, so that the perceived local depths 522, 524 are substantially the same as the actual local depths 504, 506. In this manner a linear mapping between the actual local depths and the perceived local depths is achieved. Thus, the perceived image has correct depth cues.

Figure 11:
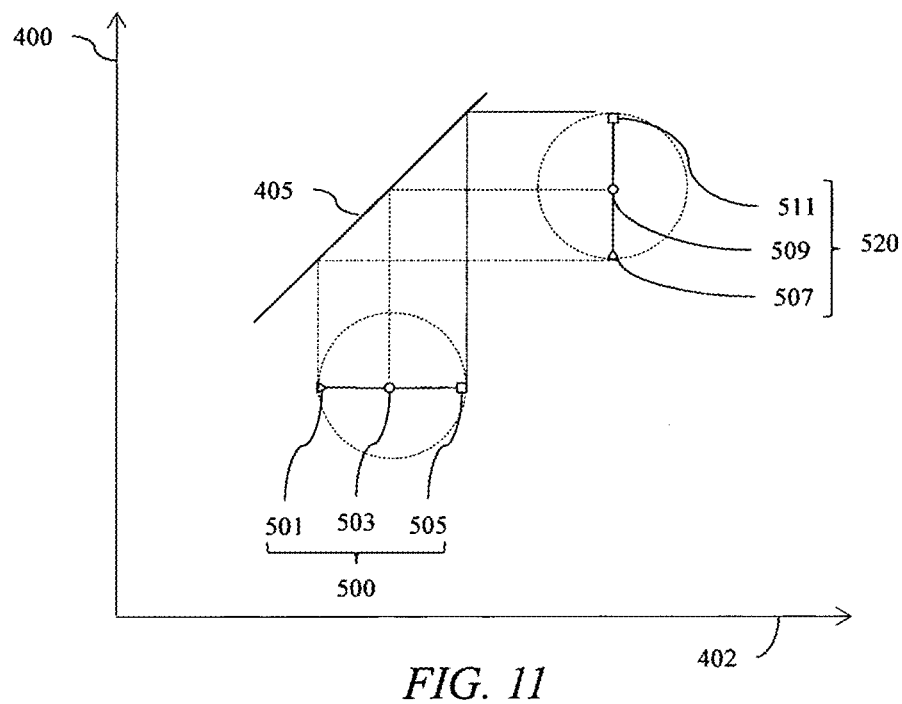
FIGS. 11-12 are schematic diagrams illustrating graphs of input depth against perceived depth for a general object and human head respectively, in accordance with the present disclosure.
Figure 12:
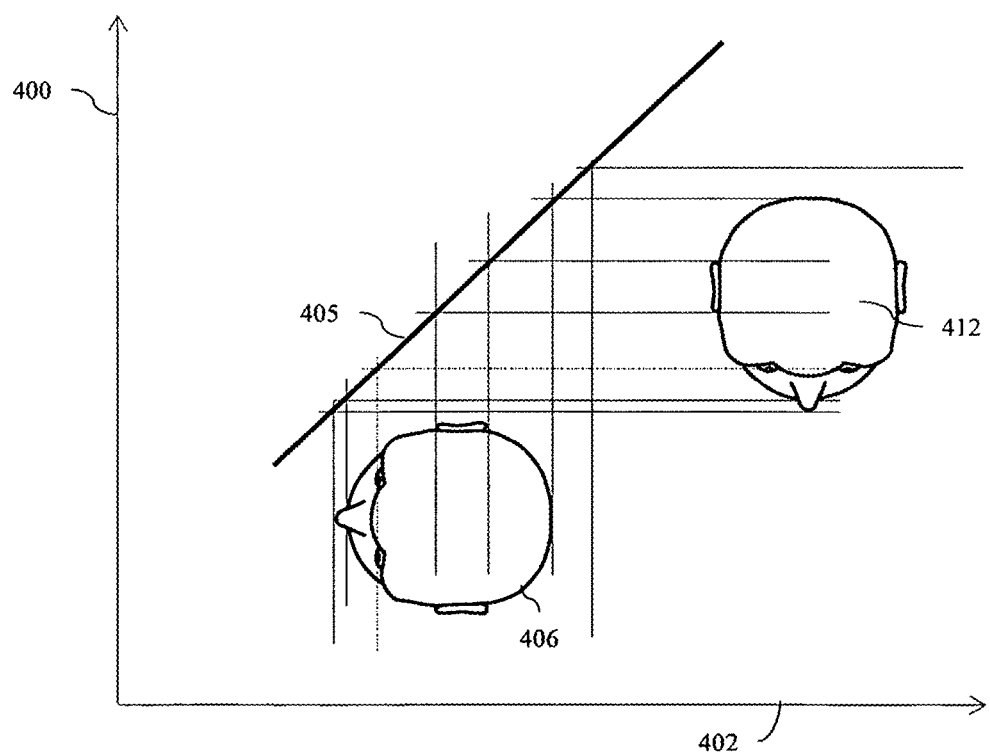

FIGS. 11-12 are schematic diagrams illustrating graphs of input depth 402 against perceived depth 400 for a general object and human head respectively. Such graphs can conveniently be used to illustrate the mapping between input depth ranges (represented by local depths 506, 504 in FIG. 8A) and perceived depth ranges (represented by local depths 522, 524 in FIG. 10). For linear mapping described in FIGS. 8-10, the mapping function 405 can be represented as a straight line. Point 501 is relayed to point 507 through the mapping function 405. The perceived object 520 has the same relationship between local depth and width as the input object. Thus the perceived local depth is the same as the expected local depth and the perceived roundness is the same as the expected roundness.

Further FIG. 12 shows the mapping of a source observer head 406 and background to a perceived source observer head 412. The linear mapping shown by line function 405 preserves head roundness; that is real depth variations of the head 406 is linearly mapped to perceived depth variation. Otherwise stated, the perceived roundness that is the same as that expected if the source observer were directly observed.

In many systems, it is desirable to change the angular display width the observer compared to the angular captured width. Further it is desirable to vary at least the position of the object 500, field of view of cameras 164, 166 and the viewing distance of the observer from the display. As will be described such variations result in non-linear mapping between input local depth and perceived local depth.

Figure 13A:
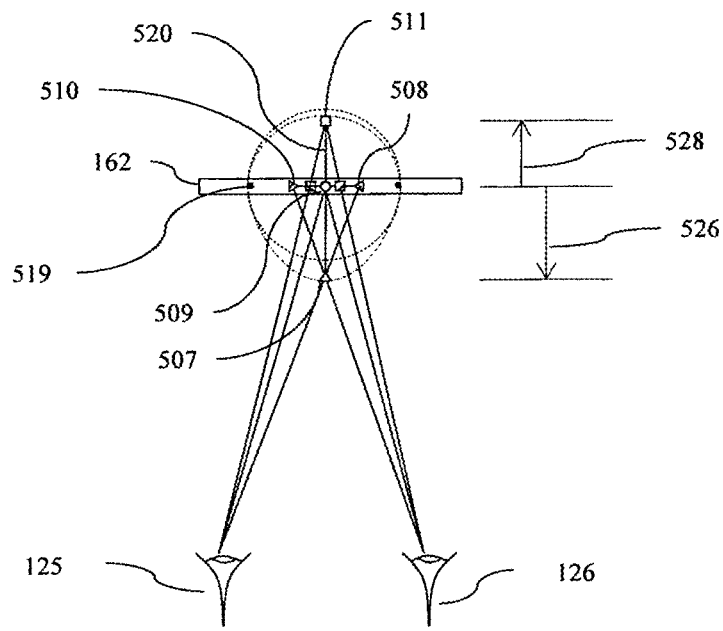
FIG. 13A is a schematic diagram illustrating in top view perceived depth for the capture of arrangement of FIG. 8B, with smaller displayed image width than that shown in FIG. 10, in accordance with the present disclosure.

FIG. 13A is a schematic diagram illustrating in top view perceived depth for the capture of arrangement of FIG. 8B, with smaller displayed image width than that shown in FIG. 10, that is the image is demagnified during display. Reconstruction of perceived image 520 shows that perceived local depth 526 from the mid-point 509 to the near point 507 is greater than perceived local depth 528 from the mid-point 509 to the far point 511. Thus distortions of perceived local depth in comparison to expected local depth are provided.

Figure 13B:
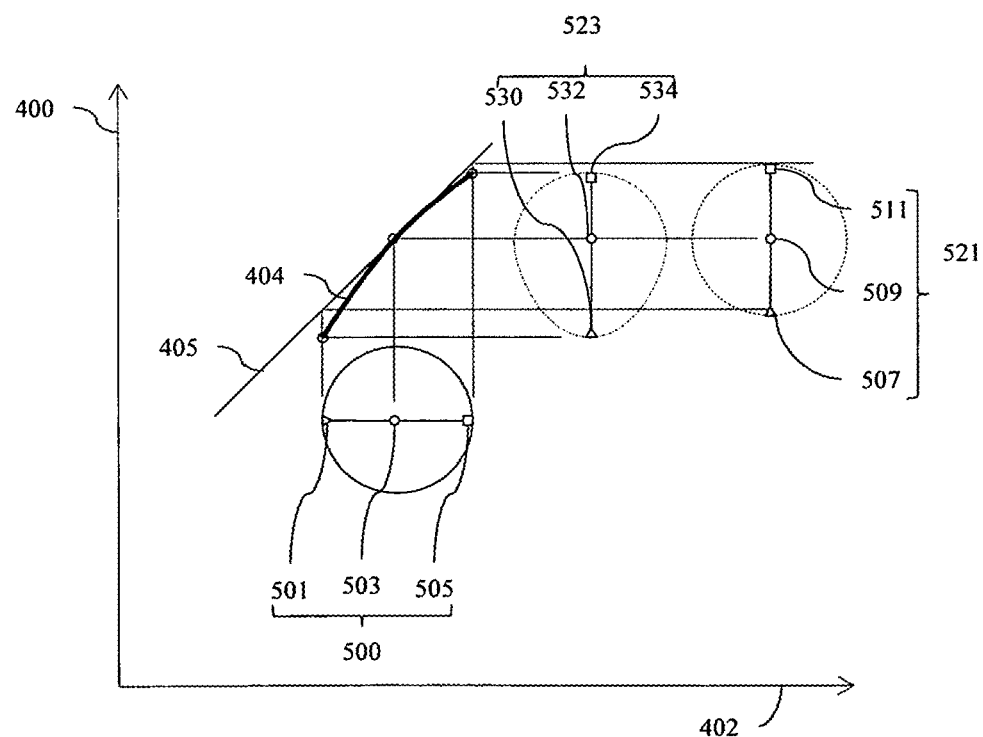
FIG. 13B is a schematic diagram illustrating a graph of input depth against perceived depth for the non-linear depth mapping arrangement of FIG. 13A, in accordance with the present disclosure.

FIG. 13B is a schematic diagram illustrating a graph of input depth 402 against perceived depth 400 for the non-linear depth mapping arrangement of FIG. 13A. In comparison to the linear mapping function 405, non-linear mapping function 404 produces perceived object 523 with the depth distortion of FIG. 13A between perceived image points that are in front of perceived mid-point 532 and behind perceived mid-point 532.

Figure 13C:
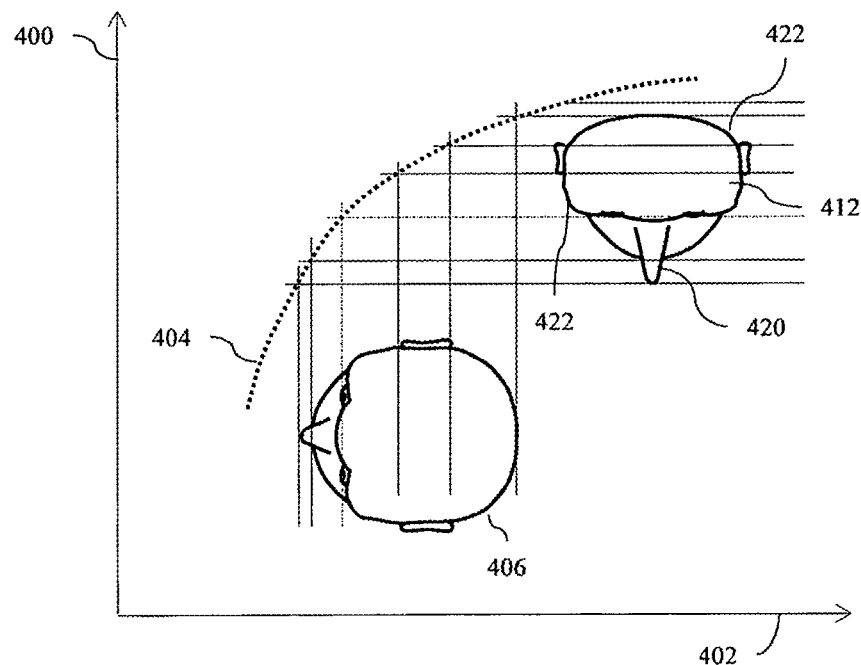
FIG. 13C is a schematic diagram illustrating a graph of input depth against perceived depth for the non-linear mapping of a human head, in accordance with the present disclosure.

FIG. 13C is a schematic diagram illustrating a graph of input depth against perceived depth for the non-linear mapping of a human head. Thus nose 420 is perceived as being extended in depth and the rear of the head is compressed in depth compared to the depth that would be expected.

To provide telecommunications devices with larger display size it would be desirable to increase the separation of cameras 164, 166 compared to the typical human interocular separation.

Figure 14A:
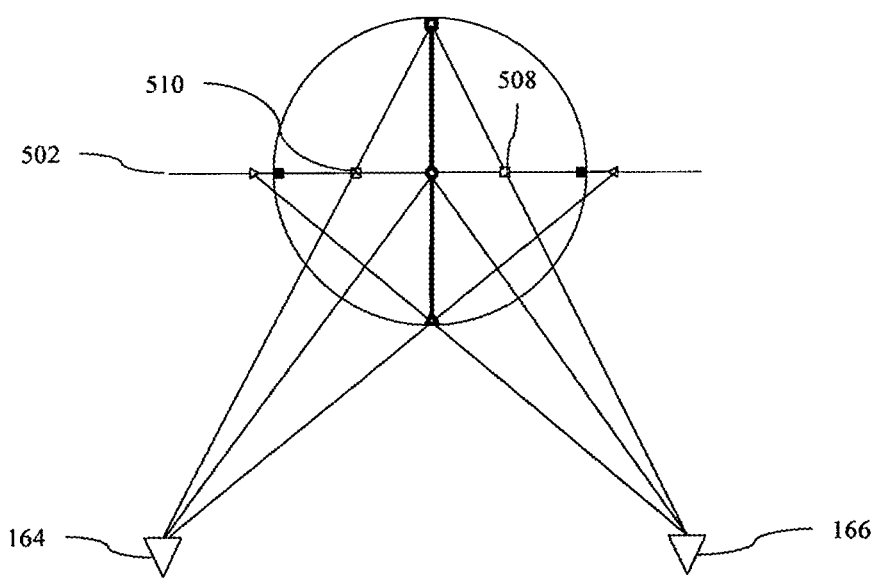
FIG. 14A is a schematic diagram illustrating in top view capture of an image with a wider separation of cameras compared to the arrangement of FIG. 8B, in accordance with the present disclosure.
Figure 14B:
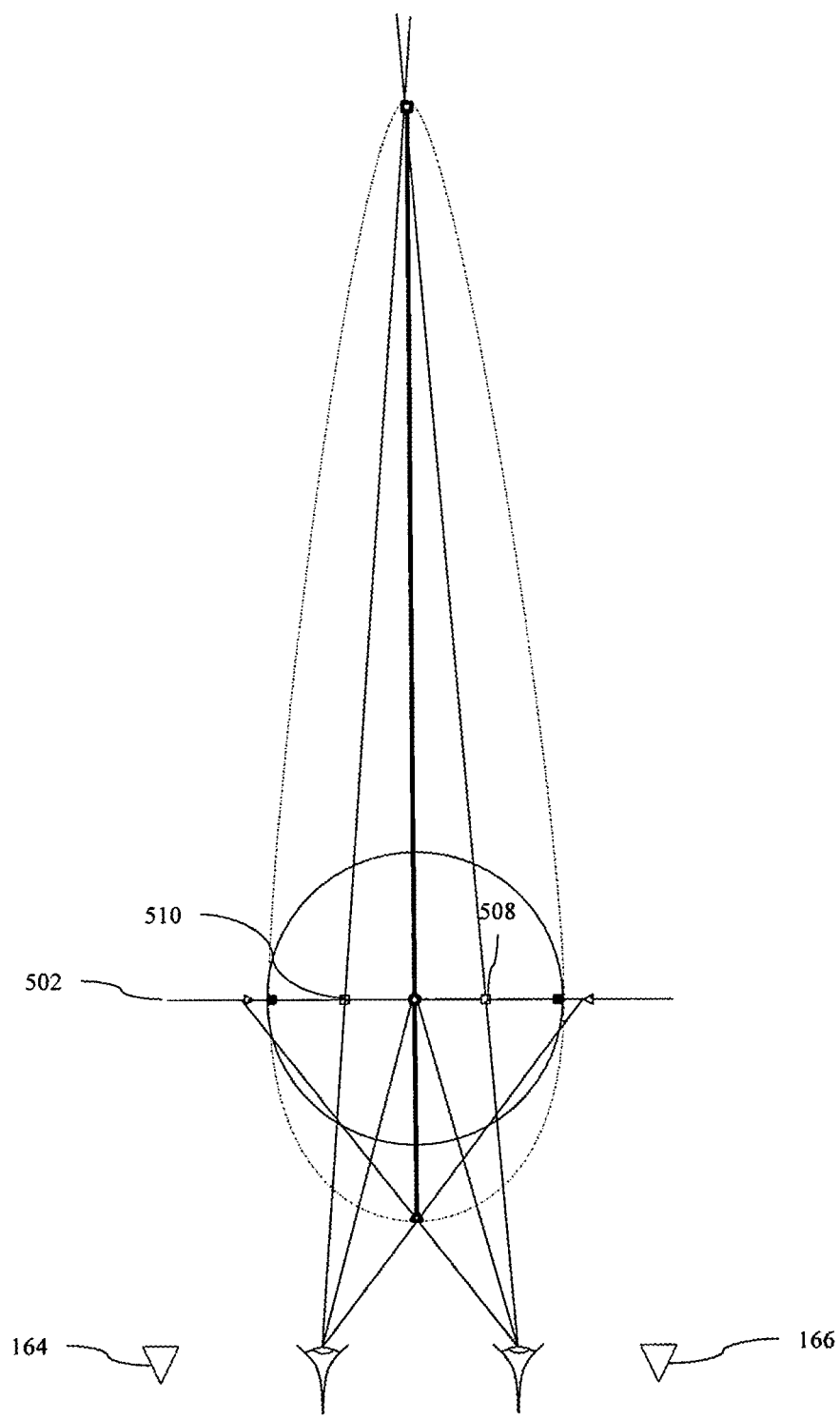
FIG. 14B is a schematic diagram illustrating in top view perceived depth for the capture of arrangement of FIG. 14A, in accordance with the present disclosure.
Figure 14C:
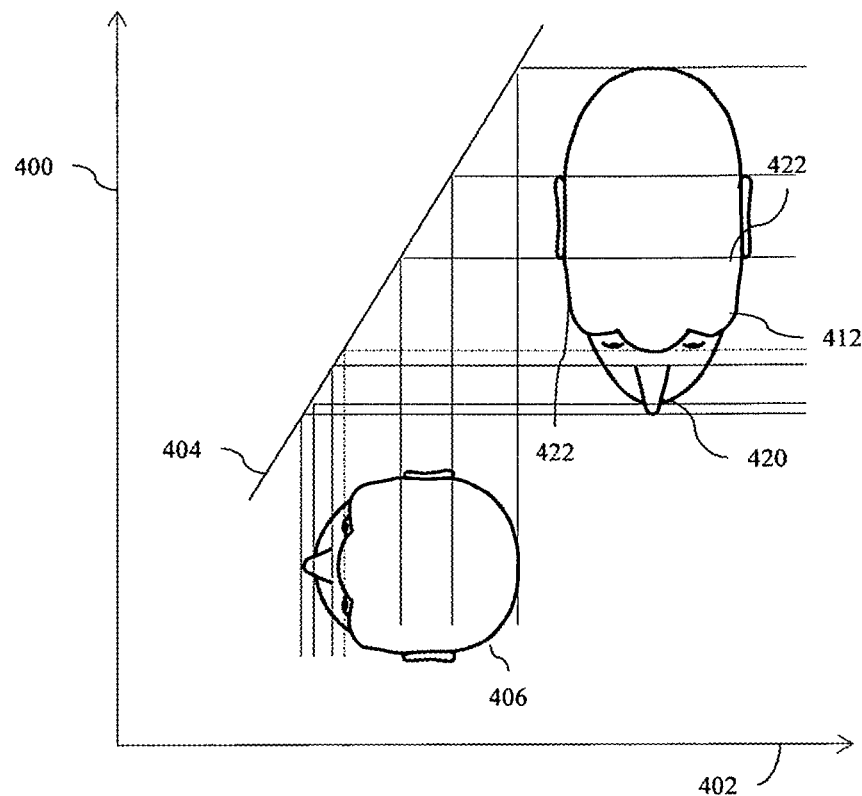
FIG. 14C is a schematic diagram illustrating a graph of input depth against perceived depth for the non-linear mapping of a human head shown in FIG. 14B, in accordance with the present disclosure.

FIG. 14A is a schematic diagram illustrating in top view capture of an image with a wider separation of cameras compared to the arrangement of FIG. 8B; FIG. 14B is a schematic diagram illustrating in top view perceived depth for the capture of arrangement of FIG. 14A and FIG. 14C is a schematic diagram illustrating a graph of input depth against perceived depth for the non-linear mapping of a human head shown in FIG. 14B. Such a mapping between input depth 402 and perceived depth 400 for the non-linear mapping of an observer's head 406 is common for the mapping between telecommunications devices with camera base line separation and display width that are wider than typical eye separation. Nose 420 and sides 422 are perceived as being extended in depth compared to the depth expected.

Thus, FIGS. 13C and 14C illustrate the extended perceived nose region 420 length in comparison with expected length. Such an effect may be termed the "Pinocchio effect". Further, the wide camera separation of FIG. 14C may provide an extended perceived head width due to the perspective view of the head.

Figure 18A:
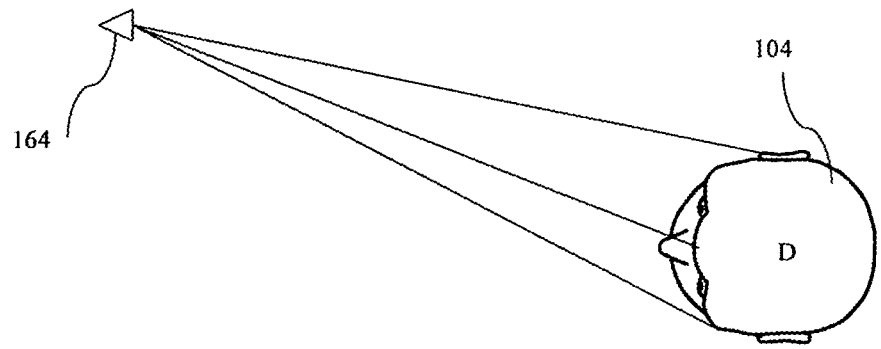
FIGS. 18A-18B are schematic diagrams illustrating the Pancake effect of extended stereo camera separation in comparison to eye separation, in accordance with the present disclosure.
Figure 18B:
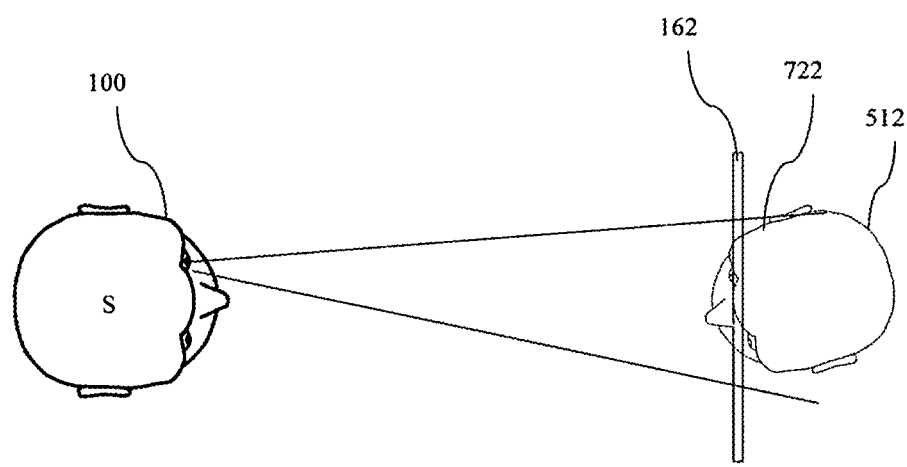

FIGS. 18A-B are schematic diagrams illustrating a slightly different effect of depth perception arising from parts of a region that are occluded in the other image. FIG. 18A shows that the left camera 154 images the side of the head of the source observer 100 as an example of a part of the head that is occluded in the image captured by the right camera 156. FIG. 18B shows the replay to one eye, wherein the source observer 100 sees a left eye image 512 on the display 162 that is rotated compared to the expected head that would be seen if the observer was observing the destination observer 104 directly. In particular the perceived cheek regions 722 are extended compared to the cheek regions that would be expected. This distorts the image and creates a reduced perception of depth in that the image seems wider than it actually is. Such extended width may be termed the "Pancake effect" because when viewed in stereo, such combined perceived images appear to provide an extended head width on both sides of the face. That is, the brain interprets both an extended left side of the face and right side of the face. Such extended head width provides an unnatural appearance and visual strain.

It would be desirable to remove the Pancake and Pinocchio effects. The image processing steps of the present embodiments adjust the perceived local in accordance with local expected depth to correct for the Pinocchio and Pancake effects based on knowledge of expected shape of head to achieve expected depth.

There will now be described a method of adjusting perceived roundness in a stereoscopic pair of images. In general, the method may be performed on any pair of stereoscopic pair of images.

The method could in principle be performed on a single one of the stereoscopic pair of images, but it is preferred to perform the method on each image, in particular performing opposite operations on each one. In operation, typically a destination observer will inspect the image of eyes of the source observer that is between the left and right eye cameras of the source display. Thus the distortion effects arise from each of the stereo cameras of the source display, and are best corrected by processing each image. Further the alignment of the perceived gaze direction of the source observer may be substantially along the optical axis of the display, such that corrections may be applied to both of the left and right images to change disparity so that the perceived depth is closer to the expected depth and the distortions are applied symmetrically about the optical axis to maintain the gaze direction consistent with facial features of the source observer.

The method may be implemented in a computer apparatus. The computer apparatus may be any type of computer apparatus, for example a conventional personal computer, or a portable device such as a notebook computer, tablet computer or a smartphone. The method may be implemented in a computer program for execution on the computer apparatus. In that case, execution of the computer program causes the computer apparatus to perform the method. The computer program may be written in any suitable software language. The computer program may be stored on a computer program product, which may be any product capable of storing the program, including without limitation: a computer memory chip which may be a volatile such as RAM or non-volatile such as ROM; a magnetic recording medium such as a hard drive; a portable memory device such as a USB stick; or a portable storage medium such as a CD or DVD. The computer program product may be located in a computer apparatus that is in a remote storage location that may for example be accessed over the internet.

The method may be implemented in a telecommunication system including two telecommunication devices 150, 160 as described above. The source and destination telecommunication devices 150, 160 are computer apparatuses, for example a tablet computer or a smartphone. In this case, the method is performed on a stereoscopic pair of images captured by the left camera 154 and right camera 156 of the source telecommunications device 150, or on just one of those images. As described in more detail below, the method may be performed either in the source telecommunication device 150 or in the destination telecommunication device 160, or performed in a distributed manner in both the source and destination telecommunication devices 150 and 160.

Figure 15:
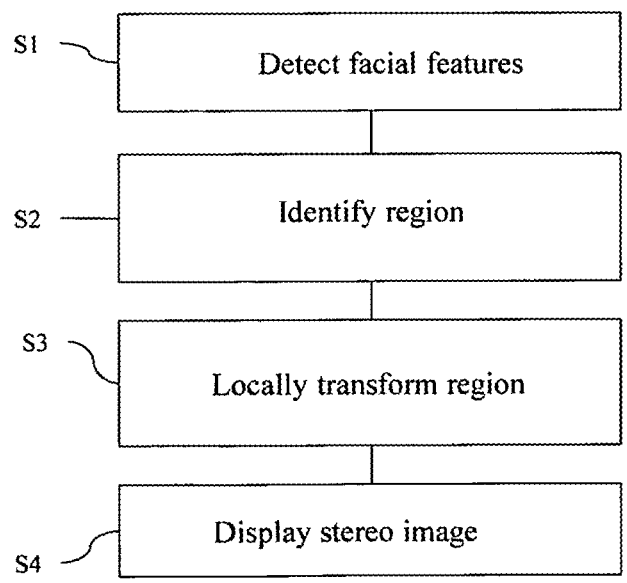
FIG. 15 is a schematic diagram illustrating a flow chart for reducing the difference between perceived and expected depth of facial features, in accordance with the present disclosure.

FIG. 15 is a schematic diagram illustrating a flow chart method of adjusting perceived roundness which reduces the difference between perceived and expected local depth of facial features.

In a first step S1, facial features of the imaged head are detected. This step may be performed using known image analysis techniques.

Figure 20A:
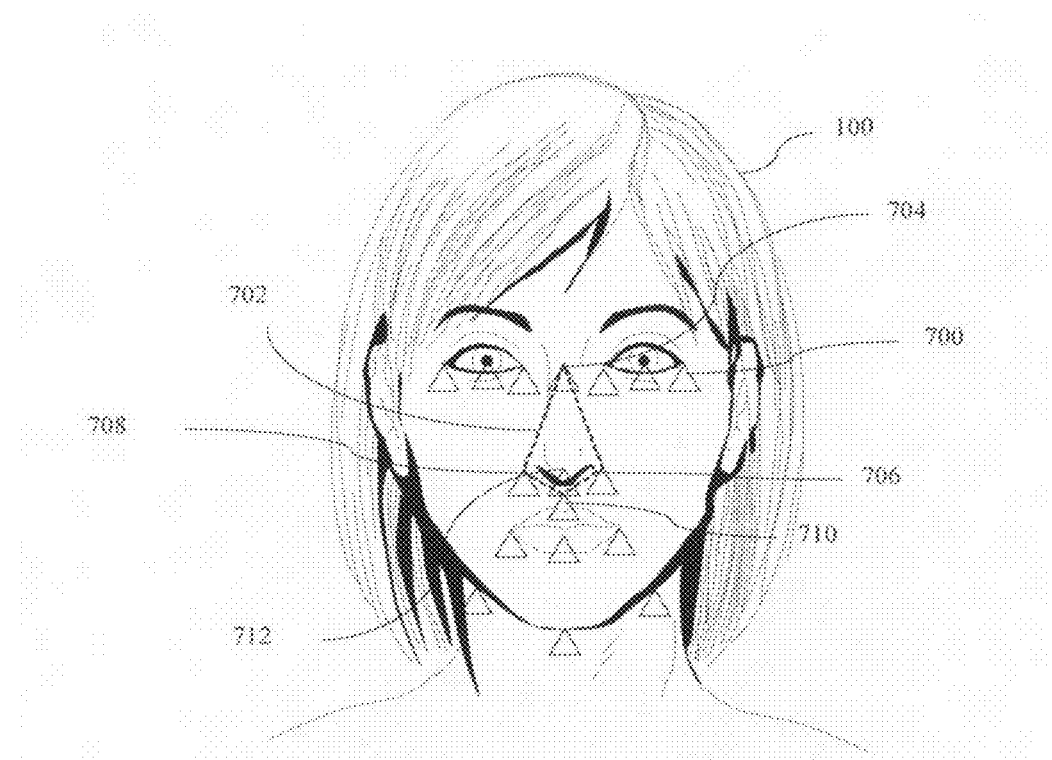
FIGS. 20A-20B are a schematic diagram and a photo illustrating the front view of a head and detected features, in accordance with the present disclosure.
Figure 20B:
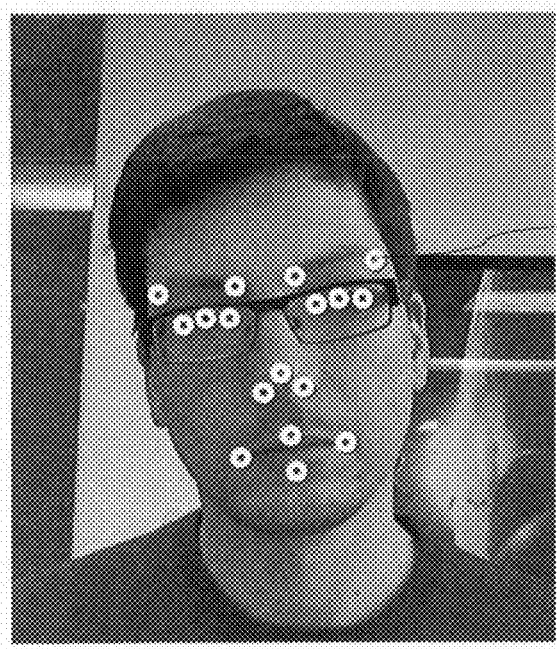
Figure 20C:
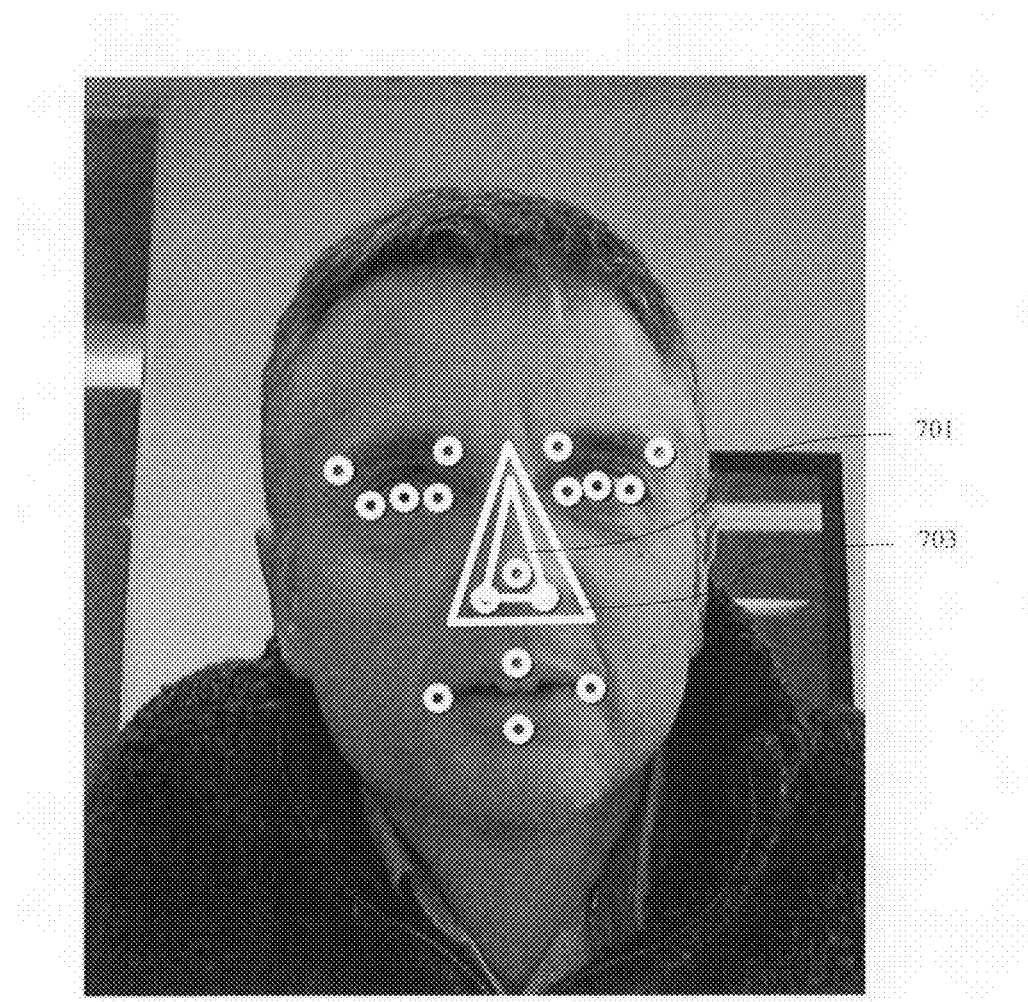
FIGS. 20C-20D illustrate a photo and nasal regions, in accordance with the present disclosure.

By way of example, FIG. 20A which is a schematic diagram illustrating the front view of a head and detected features and FIGS. 20B and 20C are actual captured images. Further FIGS. 20A to 20C illustrate an example of the collection of data representing detected features in step S1. As shown for example in FIG. 20A, the facial features detected in step S1 may include for example central glabella point 704, nostril points 706, 708, point 710 near the top of the philtrum point and nasal apex point 712. FIGS. 20B and 20C similarly show facial features detected in step S1.

Such face detector may typically provide feature points representing the locations of features using known computer vision techniques such as Active Shape Models (ASM) or Active Appearance Models (AAM) and described in "Active shape models—their training and application", T. F. Cootes et al., Computer Vision and Image Understanding, 61(1): 38-59, January 1995 and "Active appearance models", T. F. Cootes et al., IEEE Trans. Pattern Analysis and Machine Intelligence, 23(6):681-685, 2001 and incorporated herein by reference. Feature points may describe particular locations on a face such as the outline of eyes and noses. In the observer tracking arrangements of FIGS. 4-5, the location of the position between the observer's eyes may be used to determine the output direction of the viewing windows in correspondence to observer position.

The area for the movement of pixels may be determined by facial features, the corners of eyes, mouth, nostrils etc. These features may be detected either from similar looking patches using the "Viola Jones" detection method (Paul Viola and Michael J. Jones, "Robust Real-Time Face Detection", International Journal of Computer Vision 57(2), 137-154, 2004). Viola and Jones based their framework on so called Haar features, which may yield good performance on typical computer architecture. US-2012/0141017 further describes such methods that may be applied in the present disclosure, and is incorporated herein by reference.

A Haar feature is defined by two, three or four adjacent regions of two types—so called "black" and "white" regions. The value of a Haar feature of a particular size at a particular location within an image is calculated by subtracting the sum of intensities of pixels belonging to black regions from the sum of intensities of pixels belonging to white regions. Viola and Jones proposed a data structure called "integral image" that makes it possible to calculate a Haar feature of any size in constant time. Because a Haar feature is a weak classifier, a large number of Haar features are needed to distinguish between faces and not-faces with accuracy. In the Viola-Jones face detection framework, classifiers are arranged in a cascade in which each successive classifier is trained only on samples that pass through the preceding classifiers. If a classifier rejects the sub-window under inspection, no further processing is performed and the next sub-window is searched.

The possible detection results for the facial features can be linked by a predetermined shape described in Cootes, T. F., Taylor, C. J., Cooper, D., Graham, J.: "Active shape models—their training and application" Computer Vision and Image Understanding 61 (1995) 38-59, or by Pictorial Structures as described in Felzenszwalb, P., Huttenlocher, D. P.: "Pictorial structures for object recognition" International Journal of Computer Vision 61 (2005) 55-79 and related approaches as described in WO-2014/037709 incorporated herein by reference. The basic principle is a penalty term for unlikely configurations, for example, a facial feature relating to an eye is unlikely to be identified close to a feature that captures the mouth region.

From the resulting detection area of an individual feature, the position of the facial feature is inferred as a point at a constant position relative to said area.

In step S2, at least one region of the image that images a part of the head is identified. This step is performed by identifying the region(s) in relation to the detected facial features. In general terms this involves identifying a region having a particular shape in relation to the detected facial features, for example having a boundary that has a predetermined geometry in relation to the positions of predetermined facial features.

Some examples of step S2 for specific parts of the head are described in more detail below.

In step S3, the at least one region in a manner is locally transformed. This local transformation adjusts the perceived local depth of the region in accordance with expected local depth in the imaged part of the head. The expected local depth is the local depth expected for the imaged part of the head in a typical person. For example, if the part of the head includes a nose, then the expected local depth corresponds to the depth profile of a typical nose, and so on. Thus, the method makes use of knowledge that the object being imaged, that is a head, has a typical, predictable shape.

The perceived local depth is adjusted in accordance with that expected local depth to improve the roundness of reproduction that is to improve the scaling of perceived local depth with width in the displayed stereo image. This is done using knowledge of the depth mapping, that is the relationship between the perceived local depth and the actual depth, which derives from the optical and spatial properties of the camera system and display system as described above with reference to FIGS. 13A to 13C above. This allows improvement of head roundness reproduction, by making the perceived local depth closer to the expected local depth.

The local transformation in at least one region may be performed in a manner that adjusts the perceived local depth by adjusting the disparity between the stereoscopic pair of images. This is done because perceived depth of an object in a displayed stereoscopic pair of images is derived from the disparity of the object between the stereoscopic pair of images.

Mathematically, the local transformation may utilize a depth scaling function as disclosed in US-2010/0091093. In US-2010/0091093, the depth scaling function is used to modify the positions of points in a scene that is itself computer-generated and so the absolute and local depth of the points of the scene are intrinsically known. In the present method, the absolute and local depths of the points in the scene are not known. However, by identifying a region of the image that images a part of the head, the local depths that are expected for the part of the head being imaged are used. The local transformation may then utilize the depth scaling function of US-2010/0091093 in a mathematically similar manner.

The local transformation may adjust the perceived local depth by re-sampling parts of a region that are occluded in the other image. In the case of imaging parts of a region that are occluded in the other image, those parts may be distorted by the optical and spatial properties of the camera system and display system resulting in incorrect perceived depth. Accordingly, the perceived local depth may be adjusted by re-sampling those parts of the region.

The local transformation may adjust the perceived local depth by re-sampling parts of a region that are occluded in the other region. This allows the distortion of those parts, as described above, to be reduced thereby improving the roundness of reproduction.

Some examples of the local transformation of step S3 implemented for specific regions that image specific parts of the head are described in more detail below.

In step S4, the stereoscopic pair of images are stereoscopically displayed, as described above. The stereoscopic pair of images are stereoscopically displayed with an overall disparity that is selected as follows. The overall disparity is selected to provide a disparity of zero between the stereoscopic pair of images for a reference feature of the head. This causes the stereoscopic display to occur as described above with reference to FIGS. 9 and 10. Zero disparity advantageously achieves minimized visibility of crosstalk from the display system at the reference feature. Accordingly, the reference feature is chosen to be a feature at which crosstalk would be noticeable.

Figure 16:
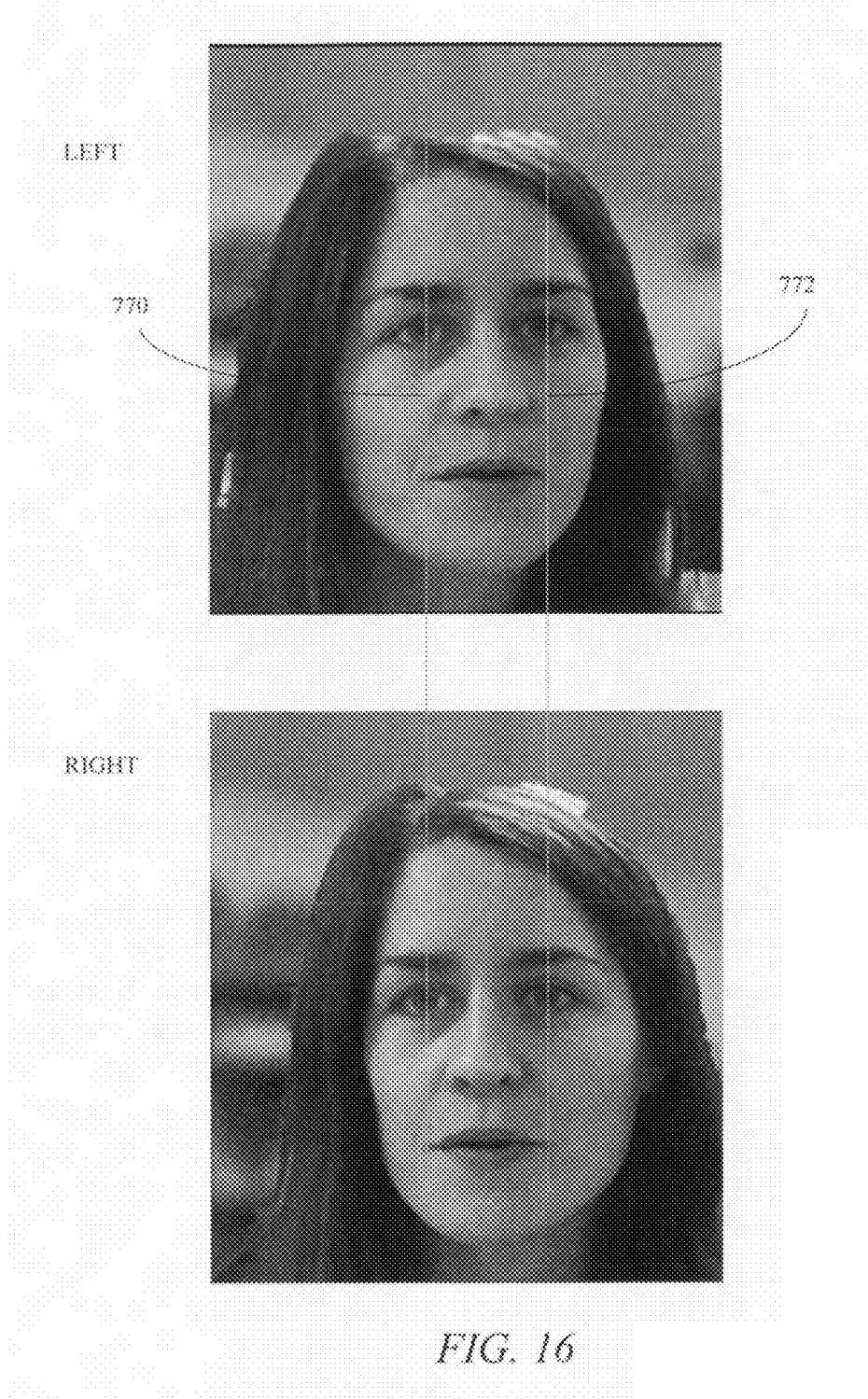
FIG. 16 shows left and right head images illustrating zero disparity between eyes in left and right images, in accordance with the present disclosure.

In one example, the reference feature is the eyes of the head. FIG. 16 shows left and right head images illustrating zero disparity between eyes in left and right images. The disparity between the eyes of the observer may be set to zero between the left and right images. Right eyes may lie on pixel column 770 in both images and left eyes lie on pixel column 772 in both left and right images. This may be performed by detecting the positions of the eyes themselves, or an average position of the pair of eyes, in each image of the stereoscopic pair of images in step S1 and selecting the overall disparity in accordance with the detected positions. When the reference feature is the eyes of the head, advantageously, the cross talk of the image may be reduced in the region of the eyes and the eye image fidelity optimised. As the eyes are high contrast regions and the point of most interest in natural gaze interaction, the image quality of the eyes for stereoscopic display may be maximised in comparison to other regions of the face and head.

In another example, the reference feature is the outside of the cheeks of the head.

Figure 17:
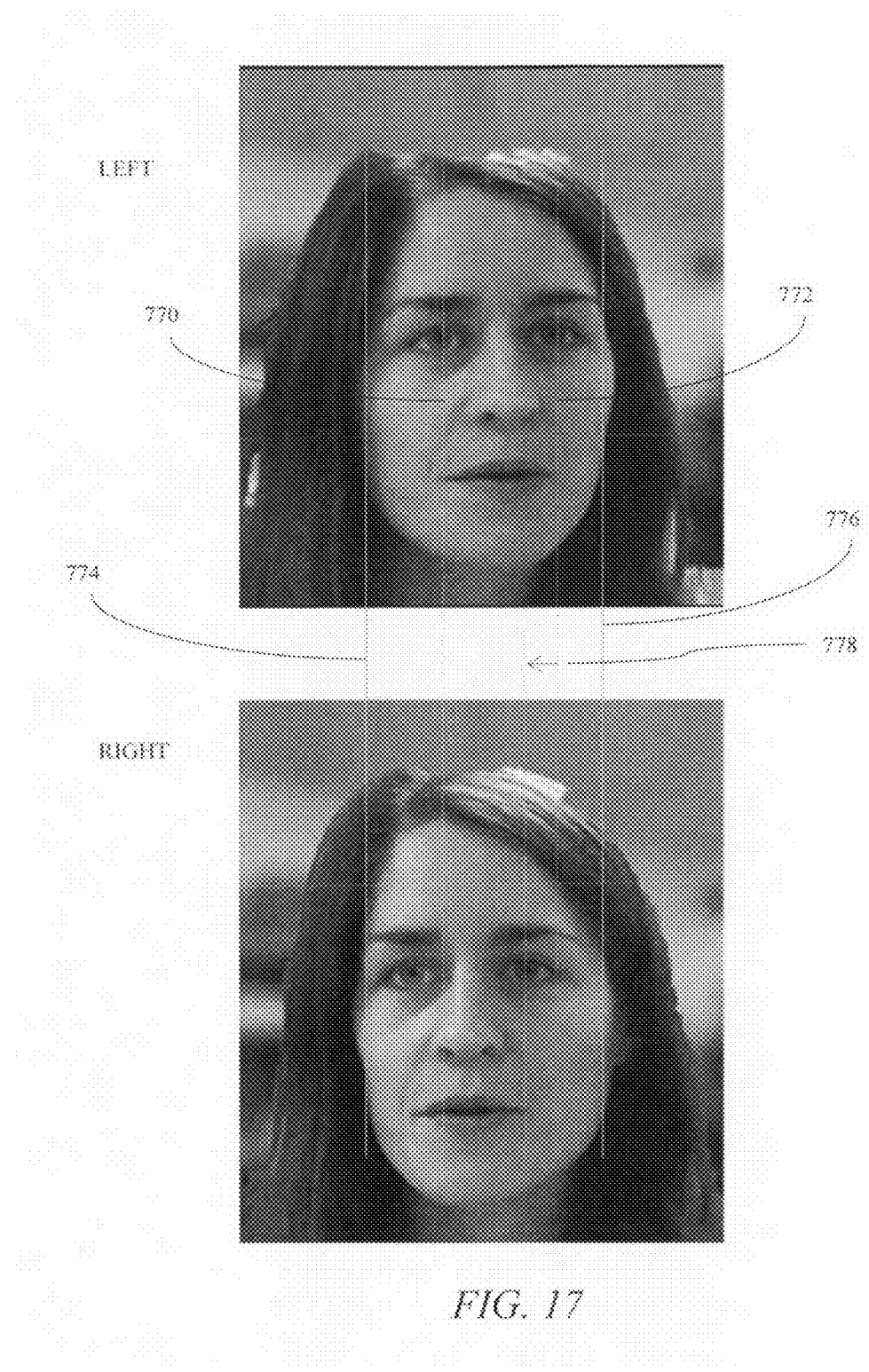
FIG. 17 shows left and right head images illustrating zero disparity between cheek edges in left and right images, in accordance with the present disclosure.

FIG. 17 shows left and right head images illustrating zero disparity between cheek edges in left and right images. In comparison with FIG. 16, the disparity between the images may be set close to zero for the visible edge of the cheeks so that right cheek edges are close to pixel column 774 and left cheek edges are close to pixel column 776. This may be performed by detecting the positions of the outside of the cheeks of the head, or an average position thereof, in each image of the stereoscopic pair of images in step S1 and selecting the overall disparity in accordance with the detected positions. Cheek location detection may be achieved by detection of pixel color changes in a region outside the detected eye, for example to detect the transition form skin to background or hair. When the reference feature is the outside of the cheeks of the head, advantageously, disparity errors due to the difference in cheek edge silhouette shape in left and right eyes may be minimized, reducing visual stress. Such stress may arise from the difference in cheek silhouette shape in comparison to the cheek silhouette shape expected. Finite disparity 778 may be provided for the observer's eyes so that they are not perceived as lying in the plane of the display.

The local transformation performed in step S3 may adjust the perceived local depth of the region taking into account the overall disparity with which the images are to be displayed in step S4. For example, the perceived local depth may be adjusted by reducing the magnitude of the disparity between the stereoscopic pair of images by an amount that increases with the magnitude of an expected depth in the imaged part of the head with respect to the reference feature of the head. Stereoscopic cameras typically provide larger stereo bases than would be provided by natural viewing, meaning that the perceived local depth needs to be reduced. As the reference feature is displayed with zero disparity, features in front of the reference feature have positive disparity, whereas features behind the reference feature have negative disparity. This means that reduction of the perceived local depth is achieved by reducing the magnitude of the disparity between the stereoscopic pair of images by an amount that increases with the magnitude of an expected depth, so that the perceived local depth reduces both in front of and behind the reference feature.

Various different regions may be identified in step S2 and locally transformed in step S3 of the method, in any combination, some examples of which will now be described.

In one example, the region identified in step S2 and locally transformed in step S3 may be a nasal region that images a part of the head including the nose. This is an important region in that nose shape and size can be used as identifying characteristics for individuals in face-to-face communication. A specific example of how steps S2 and S3 may be performed in this case will now be described.

Figure 19:
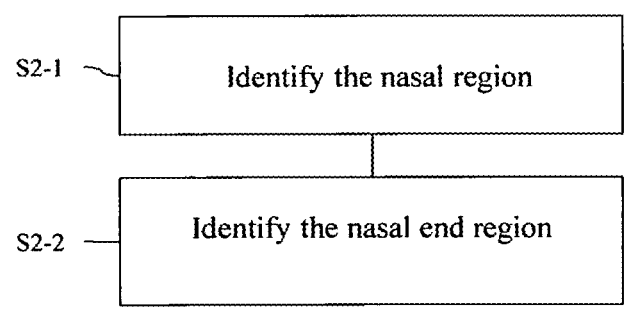
FIG. 19 is a schematic diagram illustrating a flow chart for step 2 of identifying the facial region, in accordance with the present disclosure.

FIG. 19 is a schematic diagram illustrating a flow chart for performing step S2 for an example in which the identified region is a nasal region. In this case, step S2 comprises step S2-1 of identifying the nasal region that images a part of the head including the nose and step S2-2 of identifying a nasal end region that is encompassed by the nasal region. In steps S2-1 and S2-2 the nasal region and the nasal end region are identified in relation to face features detected in step S1, as follows.

FIG. 20A illustrates an example of the nasal region 702 that is identified in step S2-1 as being defined by a locus extending along points the central glabella point 704, nostril points 706, 708, and the point 710 near the top of the philtrum point. Nasal region 702 may have linear edges or some rounded profile to advantageously reduce visibility of the adjusted region when recombined with the remainder of the face. Alternatively, the nasal region may extend outside the locus by a predetermined amount, for example to improve blending between the region and background after adjustment.

Figure 26:
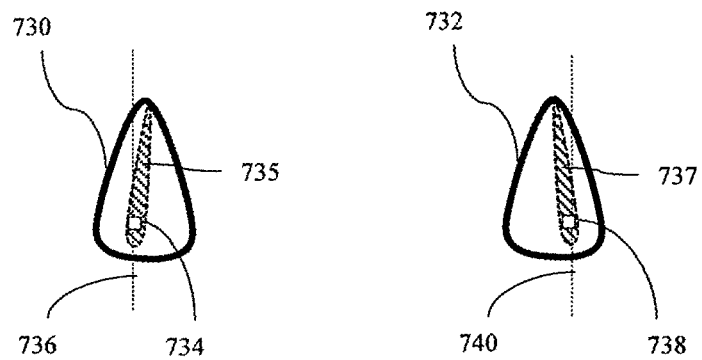
FIGS. 26-27 are schematic diagrams illustrating an alternative transformation of nasal regions to achieve reduced perceived depth compared to expected depth, in accordance with the present disclosure.
Figure 27:
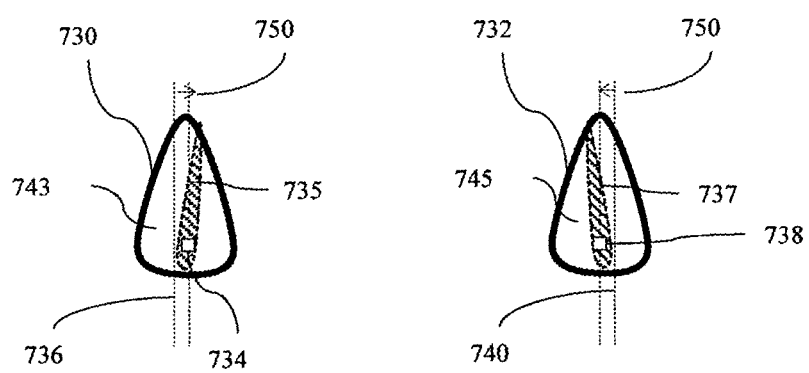

FIGS. 26-27 show that in step S2-1 the nasal region 702 provides left nasal image 730 and right nasal image 732 with respective nasal apex image points 734, 738 on lines 736, 740 respectively. FIGS. 26-27 an example of the nasal end regions 735, 737 of the right and left images that are identified in step S2-2 as being defined by a locus of extending around nasal apex points 734, 738 (corresponding to the nasal apex point 712 in FIG. 20A) and upwards in the direction of the central glabella point 704. The nasal end regions 735, 737 have a rounded profile extending around those points that is typical for a nose. the nasal region encompassing the nasal end regions 735, 737 are encompassed by the nasal regions 730, 732.

Figure 20D:
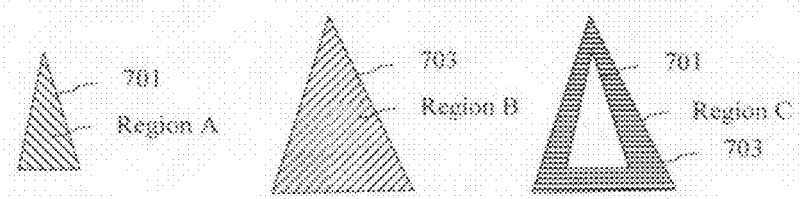

Another example of identifying a nasal region 703 and a nasal end region 703 is shown in FIG. 20D for the image shown in FIG. 20C. From the positions of facial features, an nasal end region 701 labeled as "Region A", which is typically convex, is identified, wherein the nasal end region 701 is defined mathematically as a convex hull. The nasal region 703 labeled as "Region B" is defined by extending the nasal end region 701 by a number of pixels in every direction. The size of the expansion is derived as a fraction of the area of the nasal end region 701. The part of the nasal region 703 outside nasal end region 701 the labeled as "Region C" is also shown.

Figure 22:
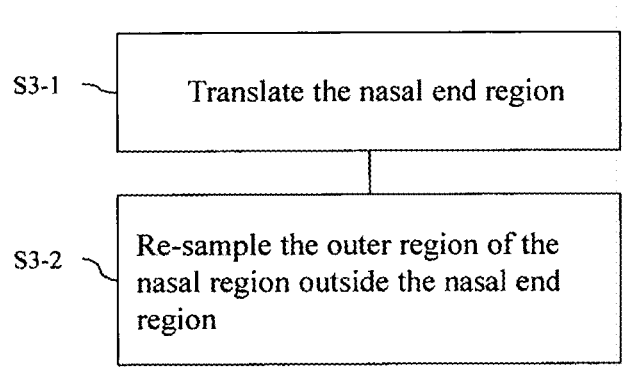
FIG. 22 is a schematic diagram illustrating a flow chart for step 3 of transforming the facial region, in accordance with the present disclosure.

FIG. 22 is a schematic diagram illustrating a flow chart for performing step S3 in the example where the region is a nasal region, for example, when step S2 is performed as shown in FIG. 19.

In this case, in step S3-1, the nasal end region 701, 735 or 737 is translated to adjust the disparity, as shown in FIG. 26. A difference vector may describe the desired motion of the nasal end region 701, 735 or 737. This may be done by copying nasal end region 701, 735 or 737 from the source position to the target position pixel-by-pixel.

The nasal end region 701, 735 or 737 is deemed to have no local depth, so it is translated only and not re-sampled. Thus, the translation adjusts the absolute depth of the nasal end region 701, 735 or 737, which corresponds to an adjustment of the local depth of the nose as a whole. Translation of the end of the nose with respect to the eye locations adjusts the perceived depth of the end of the nose. The translation may be in a lateral direction, that is in a direction parallel to the line joining the observer's pupils. The translation may typically be arranged to reduce disparity of the end of the nose with respect to the disparity of a reference feature such as the eyes or cheeks (as described above).

An example of the form of the translation is as follows.

The displacement vector d for each image (left and right) may be defined with respect to eye and nasal tip locations.

Let the centre point between the eyes be $$e=0.5*(e\_l+e\_r),\qquad\text{eqn. 1}$$

where e_l and e_r are the image positions in x, y coordinates of the left and right eye correspondingly. This point is assumed to be situated between the eyes. Let t be the position of the nasal tip in the same coordinate system.

Let the vector f_e be the vector between e_l and e_r, and f_n the vector of same direction as f_e, but with unit length. Let the vector n be defined as orthogonal to f_n, with unit length. The centre line along the face is then defined as $$L=e+b*n,b\qquad\text{eqn. 2}$$

being a scalar. Let n_e be the nasal tip projected onto L where:

$$n\_e=e+<(t-e),n>*n\qquad\text{eqn. 3}$$

and <a,b> being the dot product.

The final displacement vector d is found by adjusting the difference of the nasal tip n to the centre line between the eyes where:

$$d=a*(n\_e-t)+t\qquad\text{eqn. 4}$$

where a is a user-specified parameter between 0 and 1. Setting the parameter a to 1 would result in moving the nasal tip t on top of d, and a value of a=0 leaves t at its original location.

In step S3-2, the outer region of the nasal region 703, 730 or 732 outside the nasal end region 701, 735 or 737 is re-sampled. This re-sampling shifts pixels horizontally by an amount that is most at the boundary of the nasal end region 701, 735 or 737 and decreases to zero at the outer boundary of the nasal region 703, 730 or 732. This may performed as a linear interpolation of neighbouring pixels, whereas the exact source pixel of this neighbourhood may be determined by original direction and distance from the boundaries of the nasal end region 701, 735 or 737 and the nasal region 703, 730 or 732. Thus, the disparity of that outer region, and hence the perceived local depth, is reduced in accordance with the expected depth of the nose, for example, maximum reduction in disparity at the end of the nose decreasing to no reduction in disparity at the outer boundary of the nasal region 730, 732. This also means that the magnitude of the disparity between the stereoscopic pair of images is reduced by an amount that increases with the magnitude of an expected local depth with respect to the reference feature such as the eyes or cheek.

Figure 28A:
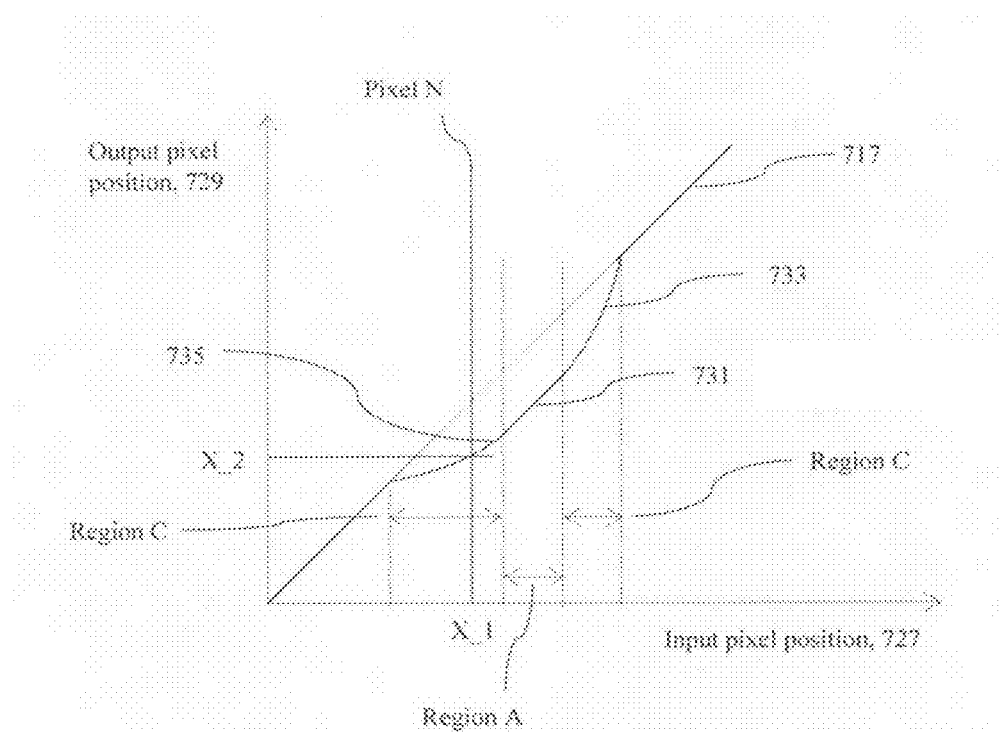
FIG. 28A is a schematic diagram illustrating a graph of pixel resampling in the nose region, in accordance with the present disclosure.

FIG. 28A is a schematic diagram illustrating a graph of pixel re-sampling in the nose region. In a given row of the nasal region, the pixels may be mapped from input pixel position 727 to output pixel position 729. Outside the nasal region, the pixels may have a 1:1 mapping as illustrated by line 717. In region A, a linear mapping 731 may also take place, although the pixels may be translated. In region C either side of region A then pixel N may be mapped from position X_1 to position X_2. The functions 733, 735 may be polynomials that are splines. Mathematically such re-sampling will be described in more detail in relation to FIG. 29C for example.

Figure 28B:
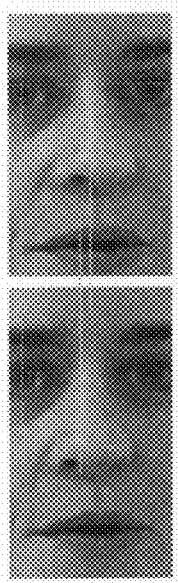
FIG. 28B is a pair of photos showing a before and after example of a nasal region transformation, in accordance with the present disclosure.

FIG. 28B shows photos showing a before and after example of a nasal region transformation. Advantageously, the Pinocchio effect can be reduced by reducing the disparity of the end of the nose in this manner.

The translation and re-sampling shown in FIGS. 23-28 thus adjusts the change in disparity between the stereoscopic pair of images with expected depth in the imaged part of the head and reduces the disparity between the stereoscopic pair of images by an amount that increases with the magnitude of the expected depth in the imaged part of the head with respect to the eyes. The shape of the nose is substantially defined by the boundaries 730, 732 that are in a depth plane that is close to the depth plane of the eyes whereas the depth plane of the nose apex is typically furthest from the plane of the nose with intermediate points at intermediate depths. The re-sampling described herein thus moves pixel information in a lateral direction, achieving a change in disparity between left and right eyes, and thus changing the perceived depth. Thus the range of perceived depths within the nasal region can be adjusted to match the expected depth for the nasal region by means of re-sampling of pixel data within the nasal region 730, 732.

The outer region of the nasal region may be re-sampled to provide a perceived depth that varies across the nasal region; thus the mapping of the nasal region may provide a substantially continuous variation of depth with position in the nose, reducing the appearance of unnatural depth changes within the nasal region. Advantageously, the magnitude of the Pinocchio effect may be reduced and natural nose shape may be achieved.

Figure 23:
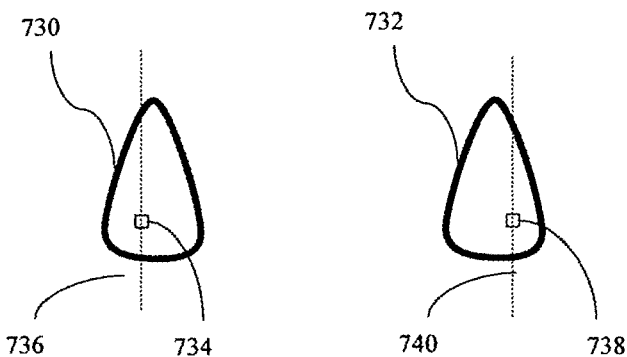
FIGS. 23-25 are schematic diagrams illustrating transformation of nasal regions to achieve reduced perceived depth compared to expected depth, in accordance with the present disclosure.
Figure 24:
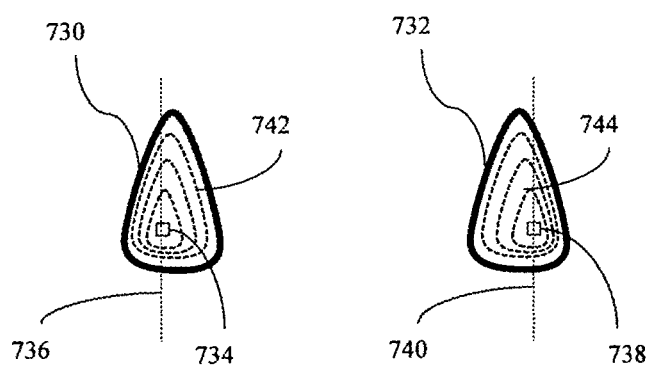
Figure 25:
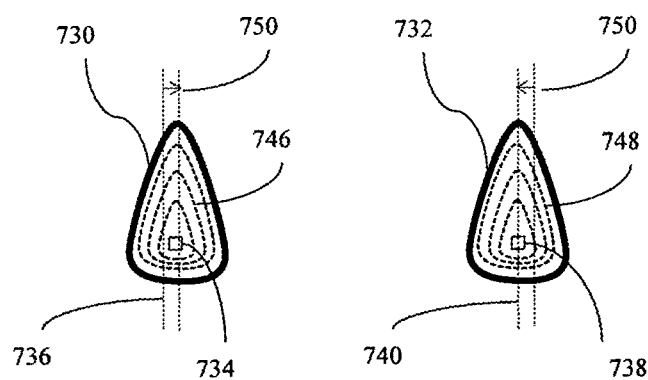

FIGS. 23-25 are schematic diagrams illustrating an alternative local transformation of the nasal regions to achieve reduced perceived depth compared to expected depth, as an alternative to that shown in FIG. 22. FIG. 23 shows that in step S2 the nasal region 702 provides left nasal image 730 and right nasal image 732 with respective nasal apex image points 734, 738 on lines 736, 740 respectively. FIG. 23 shows that nasal regions 730,734 comprise depth contours 742, 744 that are comprised in the disparity of the respective pixels within the nasal regions. As shown in FIG. 24, the contours 742, 744 may be locally re-sampled in the nasal region in a manner that adjusts the change in disparity between the stereoscopic pair of images with expected depth in the imaged part of the head providing resultant contours 746, 748 and disparity changes 750, 752 respectively in left and right images.

The translation adjustment may be performed on one of the left or right images which would increase the magnitude of the adjustment for the image. Generally preferably the adjustment is performed on both images.

In other examples, the transformation performed in step S3 may depend on the orientation and shape of the subject. As the shape of the nose varies for different individuals, there may be benefits from performing different adjustments depending on the input. This dependency can be captured by using machine learning techniques to find the optimal adjustment for an individual from representative training data derived from captured images of different individuals. The training data includes a set of labelled face regions of images of the individuals captured at wide camera separation corresponding to the expected separation in the source telecommunication device 150 (e.g. the separation 450 of length A in FIG. 6), forming set A. The training data also includes a set of labelled face regions of the same individuals, captured at narrow (desired) camera separation, forming set B. Images from set A and B are kept in correspondence. The training data is derived from a sufficiently large number of individuals (where both images from A and B, correspondingly, are of the same person at the same time and environment, only with different camera distances).

The output of the machine learning technique is a set of transformations to be applied to the identified nasal region of the input image. The transformations may be defined by respective interpolation fields F={u(x, y), v(x, y)}. Each interpolation field may define a transformation that generates an output image O given an input image I over a domain (x, y) as O(x, y)=I(x+u(x, y), y+v(x,y)). The different interpolation fields F are labelled by image features extracted from the images in the training set.

The transformation performed in step S3 uses the set of transformations (e.g. interpolation fields F) as follows. Firstly, in step S3 image features corresponding to those used in the training are detected from the image. These are used as the basis for selecting an interpolation field F from the set. Then the transformation defined by the interpolation field is performed.

One type of machine learning method that may be employed is to provide the set of interpolation directions as a lookup table with interpolation directions, e.g. random decision forests as disclosed in Ho, Tin Kam (1995). Random Decision Forests. Proceedings of the 3rd International Conference on Document Analysis and Recognition, Montreal, QC, 14-16 Aug. 1995. pp. 278-282. The lookup table is indexed by images features extracted from the input, for example an image from set A, or a new image captured under the same camera separation as set A.

Another embodiment of a machine learning method for said task is support vector regression, for example as disclosed in Drucker, Harris; Burges, Christopher J. C.; Kaufman, Linda; Smola, Alexander J.; and Vapnik, Vladimir N. (1997); "Support Vector Regression Machines", Advances in Neural Information Processing Systems 9, NIPS 1996, 155-161, MIT Press. The output of the method is a continuously varying set of interpolation directions given image features extracted from the input, for example an image from set A, or a new image captured under the same camera separation as A.

In another example, the region identified in step S2 and locally transformed in step S3 may be a side region that images the side of the head closest to the image capture position of the image and extends to a boundary at the extremity of the head in the image.

In steps S2, the side region is identified in relation to face features detected in step S1.

Figure 29A:
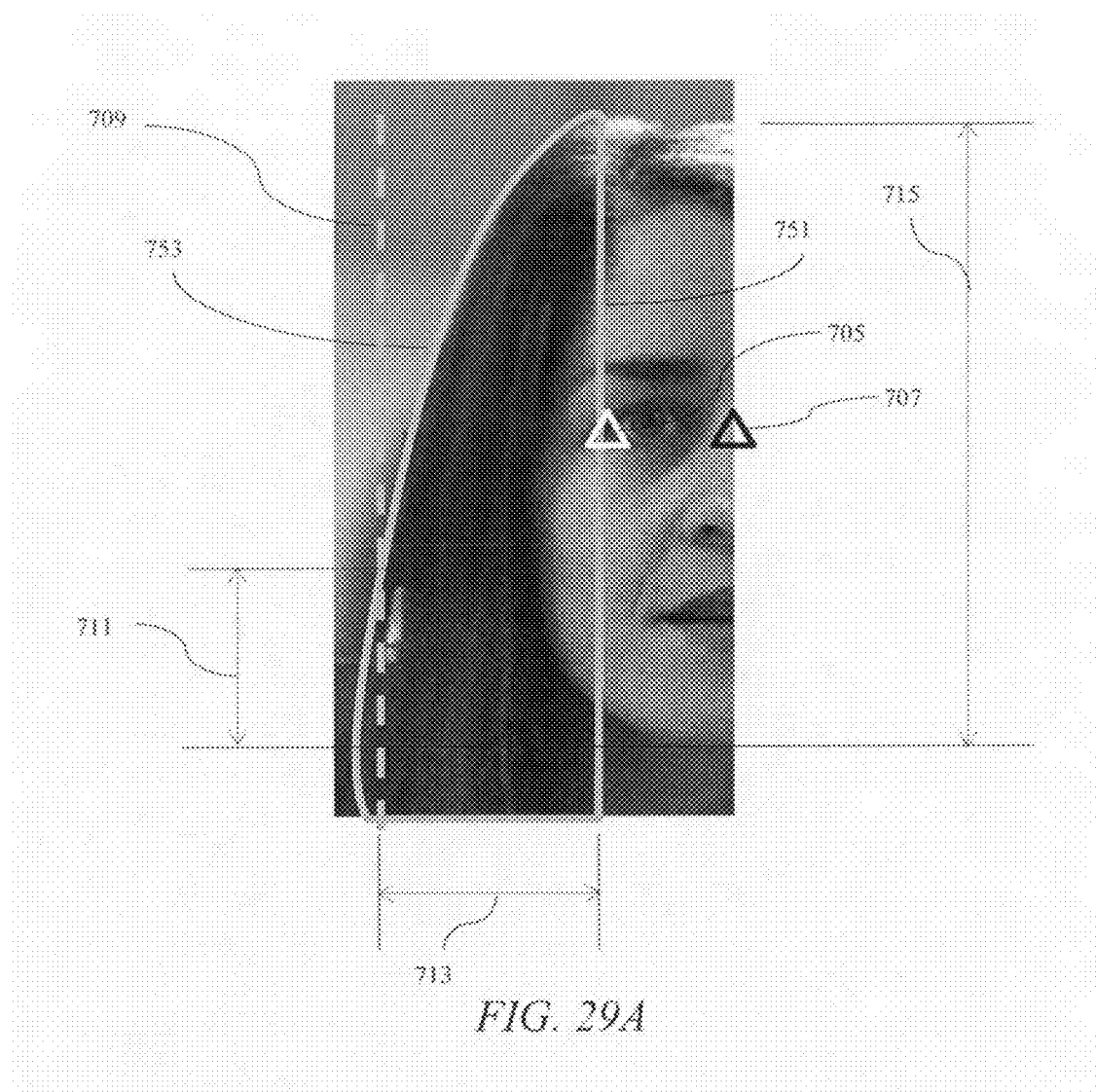
FIG. 29A is a photo illustrating identification of a side region, in accordance with the present disclosure.

FIG. 29A is a photo illustrating identification of a side region. The locus of the side region may comprise a line 751 that may be determined with respect to an outer eye detected point 705 (and orthogonal to the line formed by eye point 705, and glabella point 707). The locus 753 of the outer part of the side region may be defined by segmentation of the head (that may include the hair) from the background region. Such segmentation may use conventional techniques.

The locus of the side region may further comprise a line 709 defined in parallel to line 751. The head height 715 may be determined approximately for example by measurement of chin point positions and the maximum height of a segmented head locus 753. The distance 713 of line 709 from line 751 may be determined by finding the point 717 where the height 711 in comparison to the head height 715 is less than a minimum fraction that may be fixed in the implementation and may for example be 25%. The side region 713 may comprise a vertical swathe defined by boundaries 751, 709.

Figure 29B:
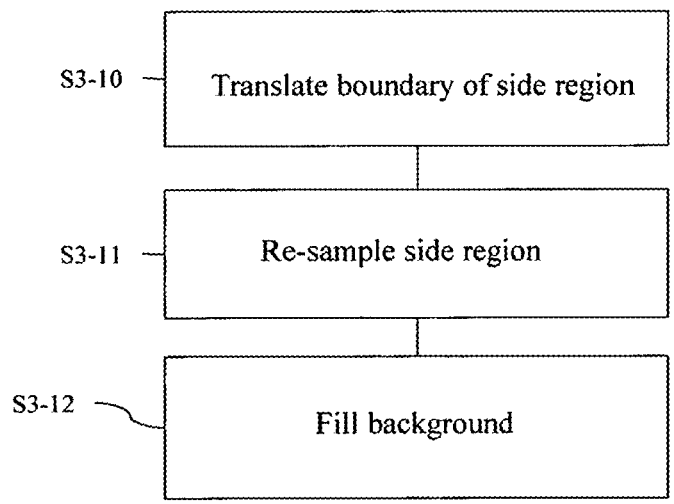
FIG. 29B is a schematic diagram illustrating a flow chart for step S3 of transforming the facial region comprising a face edge region, according to the present embodiments.

FIG. 29B is a schematic diagram illustrating a flow chart for performing step S3 in the example where the region is a side region.

In step S3-10, the boundary of the side region at the extremity of the head in the image that is closest to the image capture position is translated.

Figure 29C:
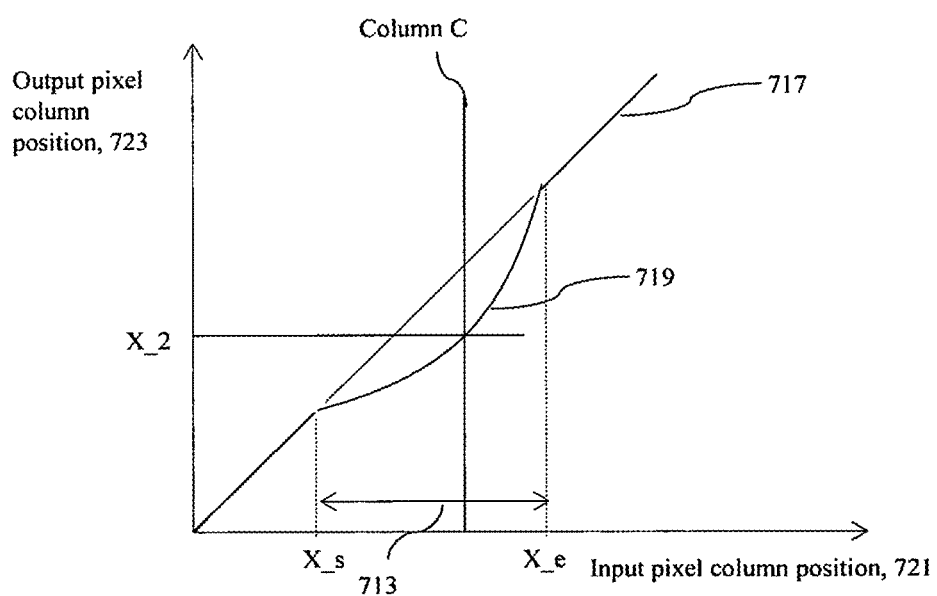
FIG. 29C is a schematic diagram illustrating a graph of pixel column displacement for a modified side region, according to the present embodiments.

FIG. 29C is a schematic diagram illustrating a graph of pixel column displacement for a modified side region and showing output pixel column position, 723 against input pixel column position 721. Line 717 represents unmodified pixel column positions and line 719 represents modified positions within the side region 713. Thus the outermost pixels of the side region 713 have the same location after translation, whereas the central pixels have the greatest translation.

Mathematically a coordinate system of the image may comprise an x axis orthogonal to the line 709 and $X=0=X\_s$ is the start of the side region at line 709, and $X=1=X\_e$ is the end of the side region at line 751. Within the side region 713, each column of pixels parallel to line 709 is resampled according to its position X within the region.

Let the region have the outer area at 0, and the inner area closer to the face at 1.

The mapping may be calculated under the constraint that the column at $X=0$ maps to 0, and the column at $X=1$ maps to 1 in the target image, for example, the width of the target region is the same as the input image.

This mapping shown for example by line 719 may be obtained by using polynomial splines.

Each output position $X\_2$ for an input column C at position X can be specified by a polynomial of degree N $$X\_2 = \text{Poly}\_N(x) = a\_0 + a\_1 * x^1 + a\_2 * x^2 + \ldots + a\_N * x^N \qquad \text{eqn. 5}$$

One embodiment of this implementation uses N=2. To obtain the coefficients for Poly_2, the third constraint can be set to the point where the centre point $x\_m$ of the region should be mapped. This can be done by setting the output as a linear combination of the start and end positions $x\_s$ and $x\_e$, for example $$X\_m = (0.5 * X\_s + 0.5 * X\_e) \qquad \text{eqn. 6}$$

$$X\_m\_2 = a * X\_s + (1-a) * X\_e \qquad \text{eqn. 7}$$

With a a scalar defined by the implementation. The equation system $$X\_s = a\_2 * x\_s * x\_s + a\_1 * x\_s + a\_0 \qquad \text{eqn. 8}$$

$$X\_e = a\_2 * x\_e * x\_e + a\_1 * x\_e + a\_0 \qquad \text{eqn. 9}$$

$$X\_m\_2 = a\_2 * x\_m * x\_m + a\_1 * x\_n + a\_0 \qquad \text{eqn. 10}$$

yields the required coefficients for the polynomial Poly_2. Other constraints, such as fixed rate of change at $x\_s$ and $x\_e$ can yield polynomials of higher orders.

In step S3-11 the side region is re-sampled for example as described in the following manner.

Let the maximum displacement vector d describe the desired motion from source and to region.

For any point (x, y) within region C, the distance to the nearest point in the outer boundary is given by $dist\_o(x, y)$.

Also for any point (x, y) within region C, the distance to the nearest point in the inner boundary is given by $dist\_i(x, y)$.

Given a maximum displacement vector d, a displacement vector v at position (x, y) is defined as:

$$v = a(x,y) * d \qquad \text{eqn.11}$$

where $$a(x,y) = \max(0, (dist\_o(x,y) - dist\_i(x,y)) / (dist\_o(x,y) + dist\_o(x,y))) \qquad \text{eqn. 12}$$

For each pixel in the target region of the output image, this vector indexes the original image. The color value at that position is copied into the pixel of the output image. Interpolation between neighbouring source pixels can be applied to smooth the appearance of the output region.

In step S3-12 the background of the image that is uncovered by translating the boundary of the side region is filled by re-sampling a region of the background outside the boundary of the side region.

The side region that is not part of a given segmentation may be copied from the original background without distortion, as the target area is the same as the source area. Thus the resampling may be a 1:1 sampling of the original background that is copied onto the replaced background. Alternatively the background pixel columns may be translated in the same manner as shown in FIG. 29C and described mathematically above.

These steps will now be illustrated in more detail.

Figure 30:
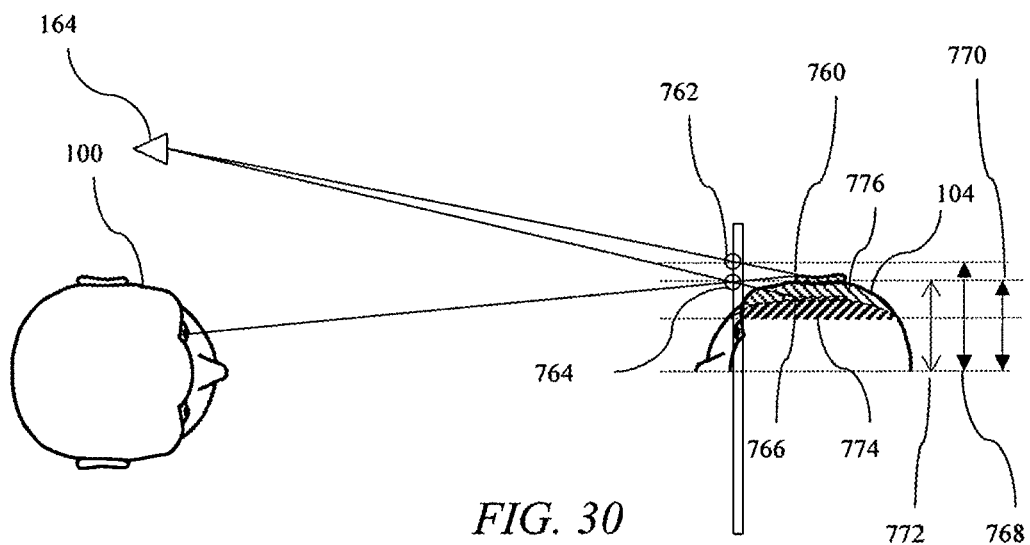
FIGS. 30-31 are schematic diagrams illustrating in top view the translation and re-sampling of the facial region comprising a region of the side of the head, according to the present embodiments.
Figure 31:
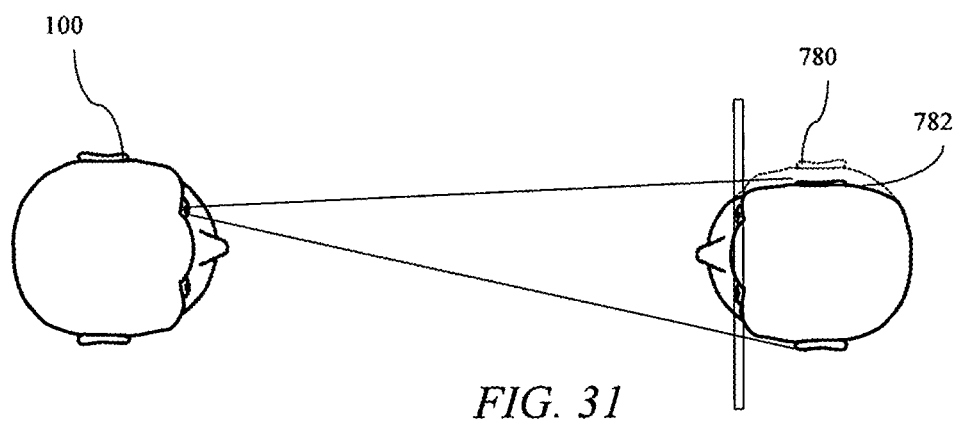

FIGS. 30-31 are schematic diagrams illustrating in top view the translation and re-sampling of the facial region comprising a region of the side of the head. Source observer 100 may be arranged in a telecommunications link with destination observer 104. The camera location provides an extended view of the side of the head of the destination observer 104 compared to that which would be seen for natural viewing. For illustration the ear tip point 760 will provide a homologous point 762 which is translated with respect to the homologous point 764 which would be expected by the source observer 100. The distance 768 from the centre line of the head to the point 760 is thus greater than the distance 770 which would be expected. If the side region of the head is re-sampled in step S3-11 to provide region 774 that is region 776 that has been re-sampled, then point 766 will appear in the re-sampled image and the correct homologous point that would be expected by the observer 100 may be achieved.

FIG. 31 illustrates the head appearance to a single eye of the source observer 100 with original boundary locus 780 and final boundary locus 782. After re-sampling the region 776 may be filled in step S3-11 by re-sampling a region of background, for example by stretching pixel data from the original background.

Figure 32:
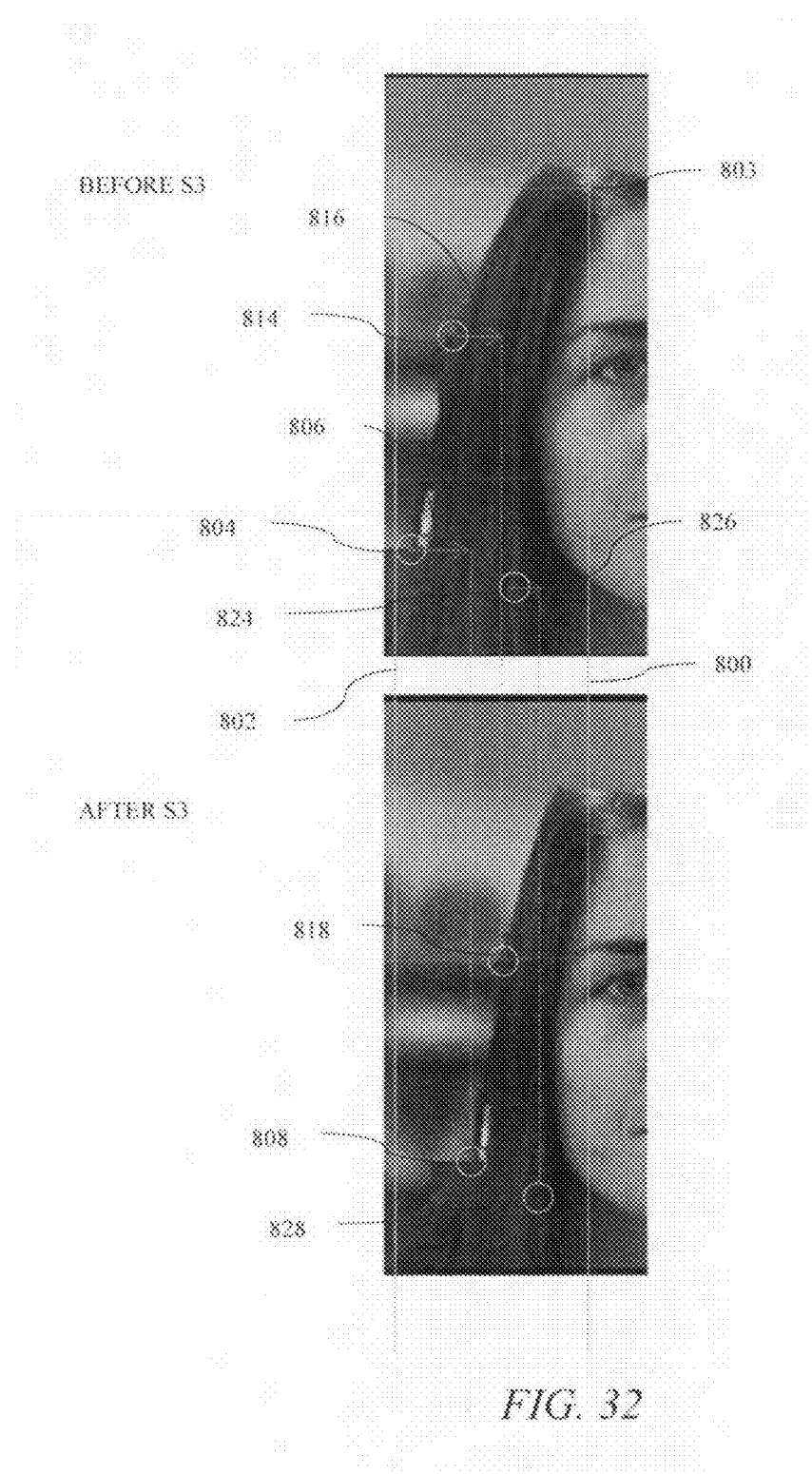
FIG. 32 is a photo illustrating an example of re-sampling of the facial region at the edge of the head, in accordance with the present disclosure.

FIG. 32 illustrates before and after step S3 photos illustrating an example of re-sampling of the facial region at the edge of the head for a left eye view of an observer's head. Boundary line 800 may be identified from facial feature detection, for example the outside edge of an observer's right eye. A boundary region width 803 with limit 802 may be further identified for re-sampling. For example a standard width 803 may be used or a segmentation algorithm may be used to identify the edge of the observer's hair. The boundary image may be re-sampled so that points 804 near the limit 802 are translated by distance 806 to point 808. Point 814 may be translated by a lower distance 816 to point 818 and point 824 closest to line 800 may be translated by smallest distance of the points 804, 814, 824 to point 828. In this manner, the disparity change applied increases with distance from the observer's right eye. Similar changes may be made to the left side of the observer's head in the right image taken by camera 166. Advantageously, the Pancake effect of the side of the head may be reduced and disparities generated that provide perceived depth for the side of the head that is similar to the expected depth.

Figure 33:
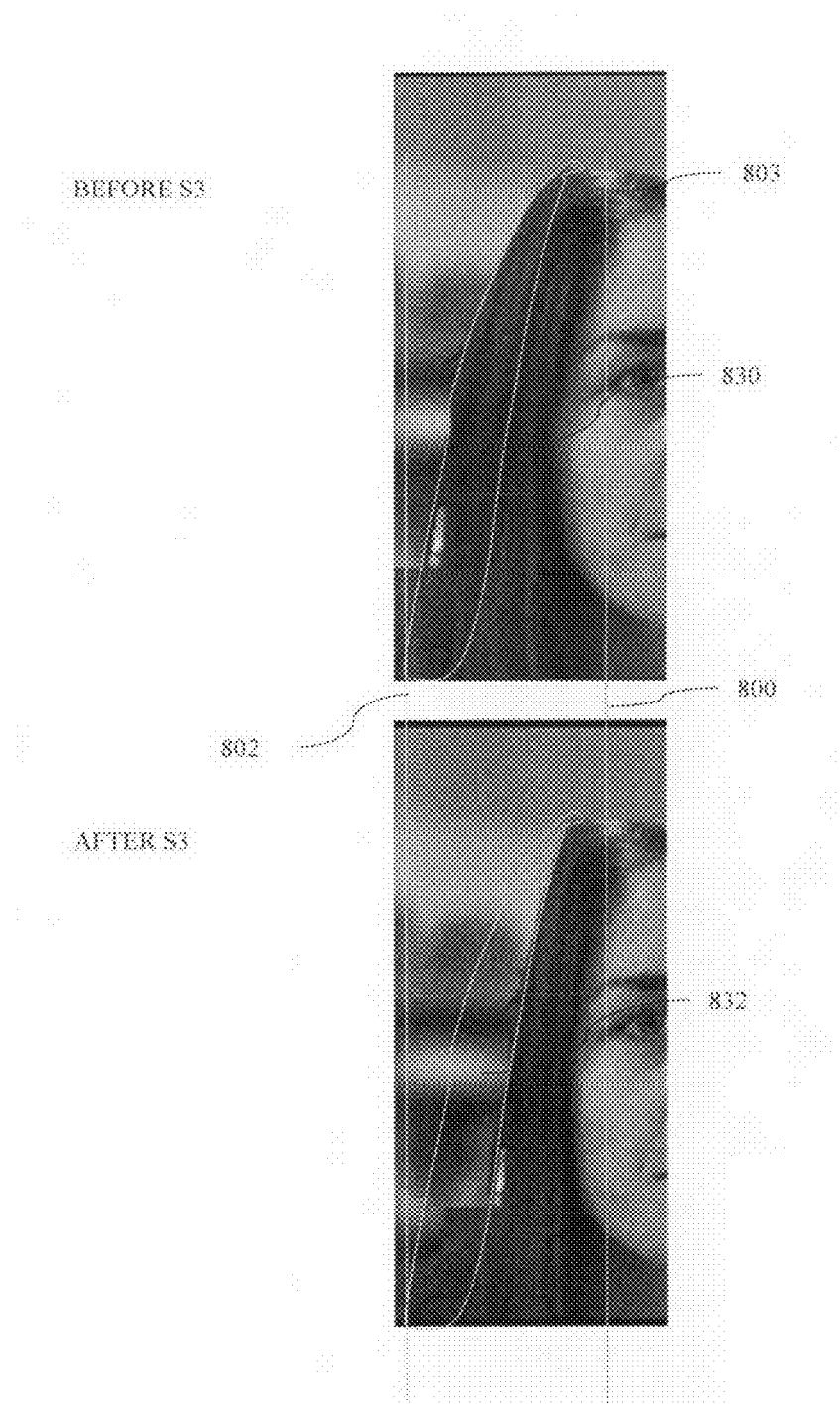
FIG. 33 is a photo illustrating an example of re-sampling of the background region at the edge of the head, in accordance with the present disclosure.

FIG. 33 illustrates before and after step S3 photos illustrating an example of re-sampling of the background region at the edge of the head. Thus region 830 is re-sampled with background image data that is re-sampled from the original background image to provide background region 832.

The image sampling of FIGS. 32-33 may be provided by re-sampling vertical columns, thus distortions that are not noticeable in the side of the head may be more visible in the background region. Such distortions can be overcome by segmenting the scaled image and replacing the background with an unscaled background. Alternatively a blank background may be provided in the scaling region.

Thus the translation and re-sampling adjusts the change in disparity between the stereoscopic pair of images with expected depth in the imaged part of the head that is the side region of the head; and reduces the disparity between the stereoscopic pair of images by an amount that increases with the magnitude of an expected depth in the imaged part of the head with respect to the eyes.

Figure 34:
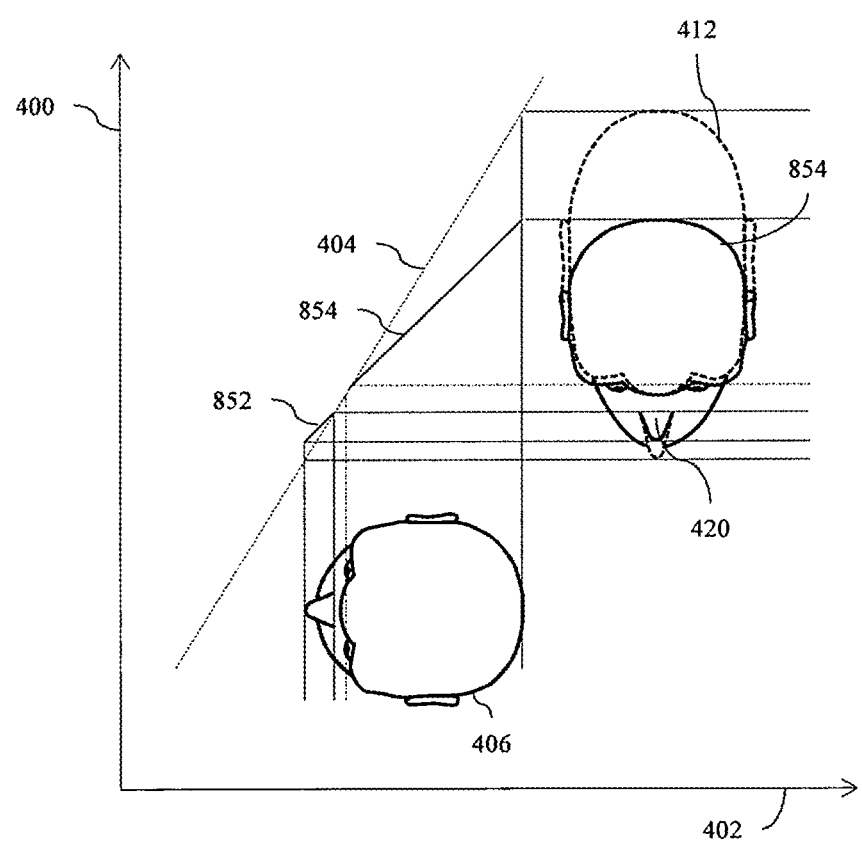
FIG. 34 is a schematic diagram illustrating a graph of input depth against perceived depth for correction of Pinocchio and Pancake effects arising from the non-linear mapping of a human head, in accordance with the present disclosure.

FIG. 34 is a schematic diagram illustrating a graph of input depth against perceived depth for correction of Pinocchio and Pancake effects arising from the non-linear mapping of a human head. The expected head 406 is mapped as shown in FIG. 14C to perceived head image 412. The adjustments of Pinocchio effect reduce the perceived depth of the nose region 420 to be the same as the expected nose depth; thus mapping function 404 is corrected to mapping function 852 in the nasal region and the function 404 is corrected to mapping function 854 in the region of the side of the head. Advantageously, Pinocchio and Pancake effects are reduced and head roundness is improved so that the perceived roundness for the facial regions is adjusted to be as expected, or closer to that expected.

Figure 21:
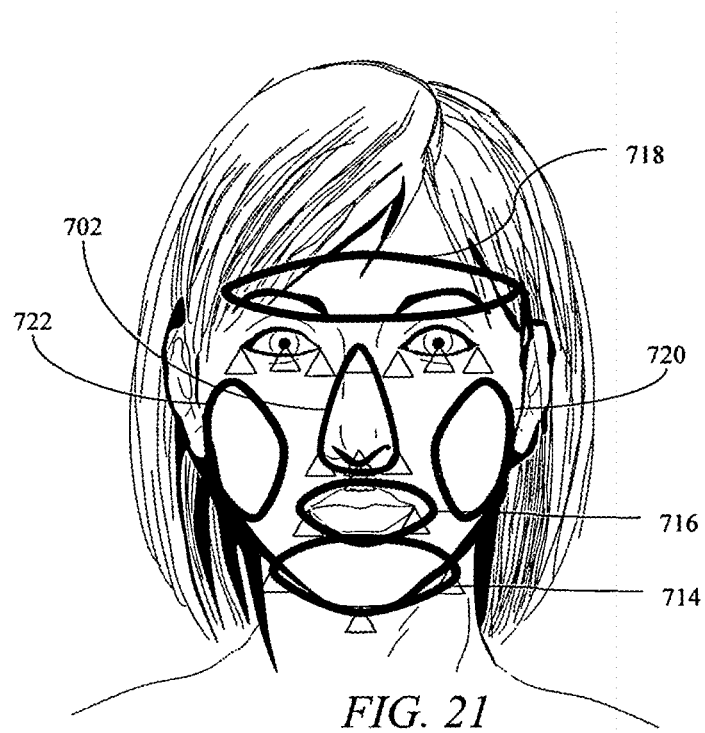
FIG. 21 is a schematic diagram illustrating the front view of a head and further detected regions, in accordance with the present disclosure.

Although the nasal region and the side region are described above for illustration, other regions could similarly be processed in addition or instead. By way of example, FIG. 21 is a schematic diagram of some other regions that could be identified and locally transformed, in particular a chin region 714, a mouth region 716, eyebrow region 718 and cheek regions 720, 722.

Above there is described an example in which steps S1-S3 of the image processing are performed in the destination telecommunication device 160 and steps of the image processing are performed in the source telecommunication device 150. However, this is not essential and in general the image processing may be performed in any device or any combination of devices of the telecommunication system through which the return images pass. Some non-limitative examples are now given with reference to FIGS. 35-37 which are schematic diagrams illustrating communication between source and destination telecommunication devices 150 and 160 arranged to achieve correction of the position of delivery and return images. In particular FIGS. 35-37 show examples in which the methods are applied bi-directionally to the return images 108 and the delivery images 120, and the location in which the return images 108 and the delivery images 120 are processed is symmetrical.

Figure 35:
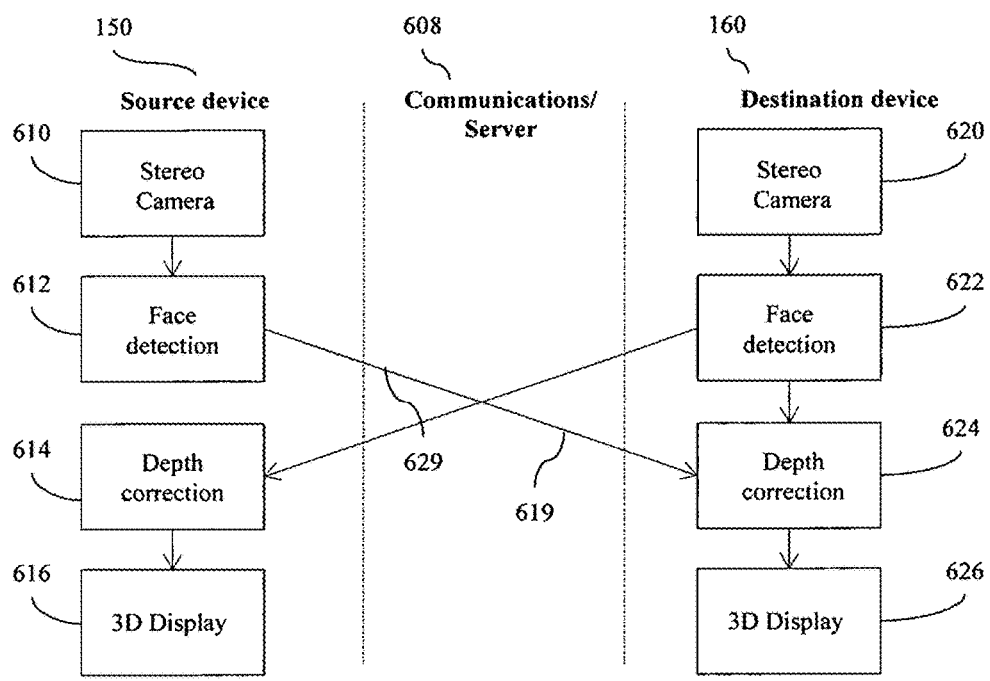
FIGS. 35-39 are schematic diagrams illustrating communication between source and destination telecommunication devices, in accordance with the present disclosure.

In FIG. 35, a stereoscopic pair of cameras 610, a face detector 612, an depth corrector 614 and an autostereoscopic display device 616 of source telecommunication device 150 are arranged to cooperate with a stereoscopic pair of cameras camera 620, a face detector 622, an depth corrector 624 and an autostereoscopic display device 626 of destination telecommunication device 160. In this example, the processing of return images 108 is performed in the same devices as shown in FIG. 5 and described above.

As described above, the face detectors 612 and 622 may be arranged as part of the tracking system for the autostereoscopic display devices 616 and 626, delivering detected face data 619 and 629 between the source device 150 and the destination device 160. Thus for the return images 108, the steps of detecting faces is performed in the destination telecommunication device 160 and the step of shifting the return image is performed in the source telecommunication device 150 and vice versa for the delivery images 120. Thus a single face tracker can advantageously achieve detection for observer tracking and teleconferencing uses, reducing cost and power consumption in the destination device 160 and not significantly affecting the performance of the source device 150.

Figure 36:
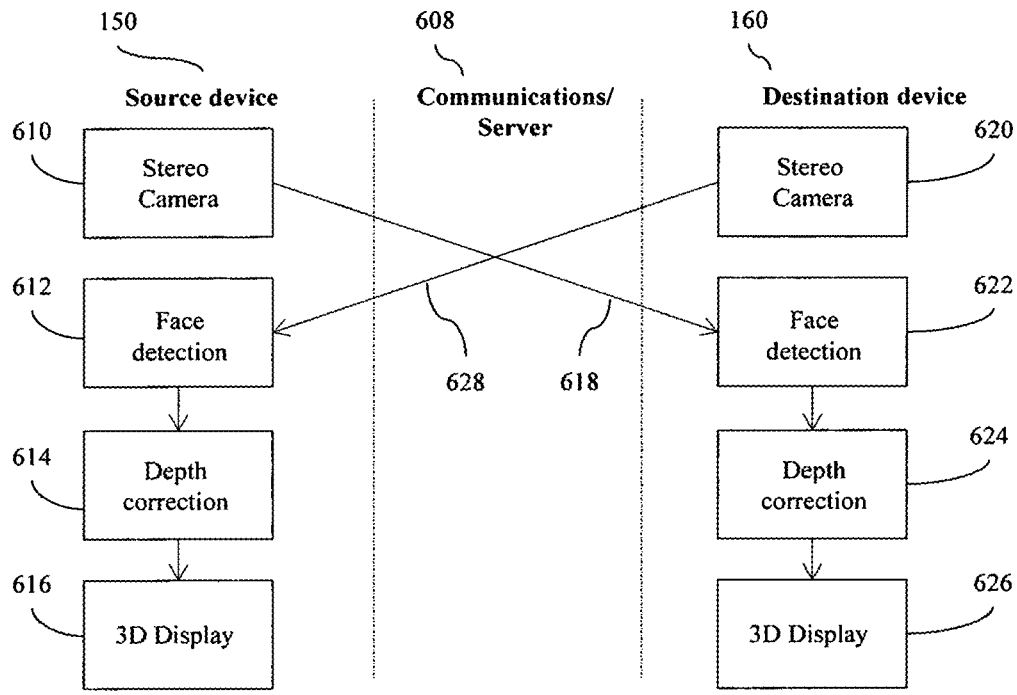
Figure 37:
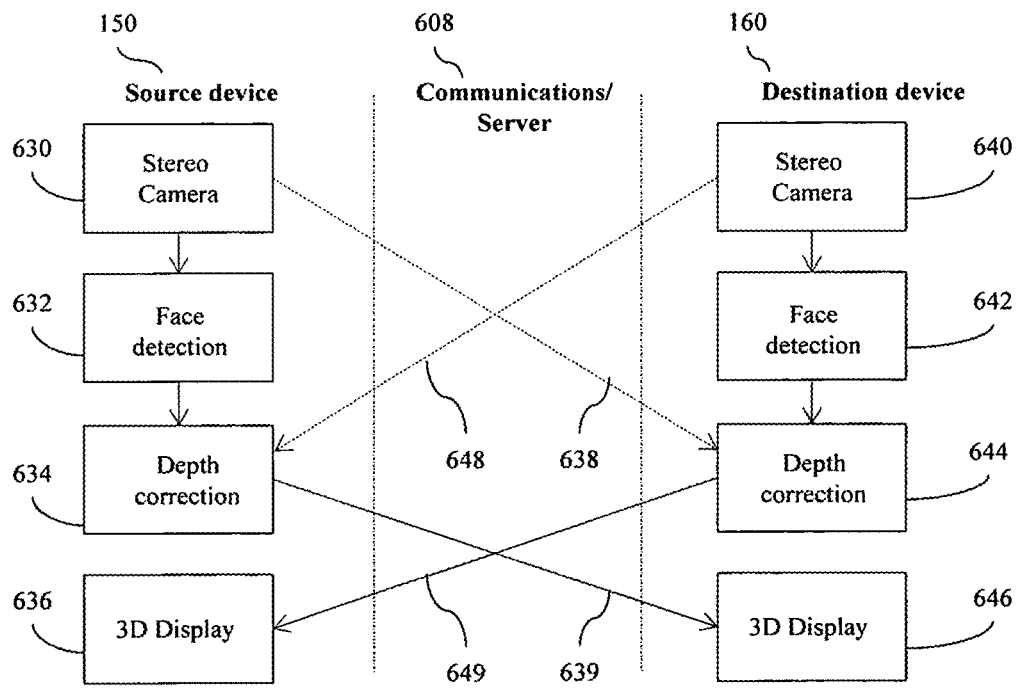

In FIG. 36, the same components are present as in FIG. 35, but the face detection may be achieved by passing unprocessed return images 628 from the destination device 160 to the source device 150 delivery images 618 to the destination device 160 from the source device 150, so that the detection and correction of face position is performed after transmission of the return images 628 and delivery images 618. Thus the steps of detecting faces and shifting the return images 628 is performed in the source telecommunication device 150 and the steps of detecting faces and shifting the delivery images 628 is performed in the destination telecommunication device 160. Advantageously, in telecommunication devices with unmatched processor capability, the destination telecommunication device 160 may be able to run a more accurate and robust face detector than the source telecommunication device 150, increasing performance for the system and enabling increased naturalness of interaction.

In FIG. 37, the same components are present as in FIG. 35, but the face detection and image correction of the return image is provided in the destination telecommunication device 160 and the face detection and image correction of the delivery image is provided in the source telecommunication device 150, so that the corrected images 639, 649 are communicated after the shifting. Knowledge of the position of the cameras in the source telecommunication device 150 and destination telecommunication device 160 may be communicated by means of data 638, 648. Advantageously, such a process can send images to devices in which the reliability of depth correction is incorporated in one of the source or destination devices.

Such a process may be further desirable for use in hybrid systems optimizing the performance by using mixtures of the methods in FIGS. 35-37 to reflect different processing capability of source and destination devices.

Figure 38:
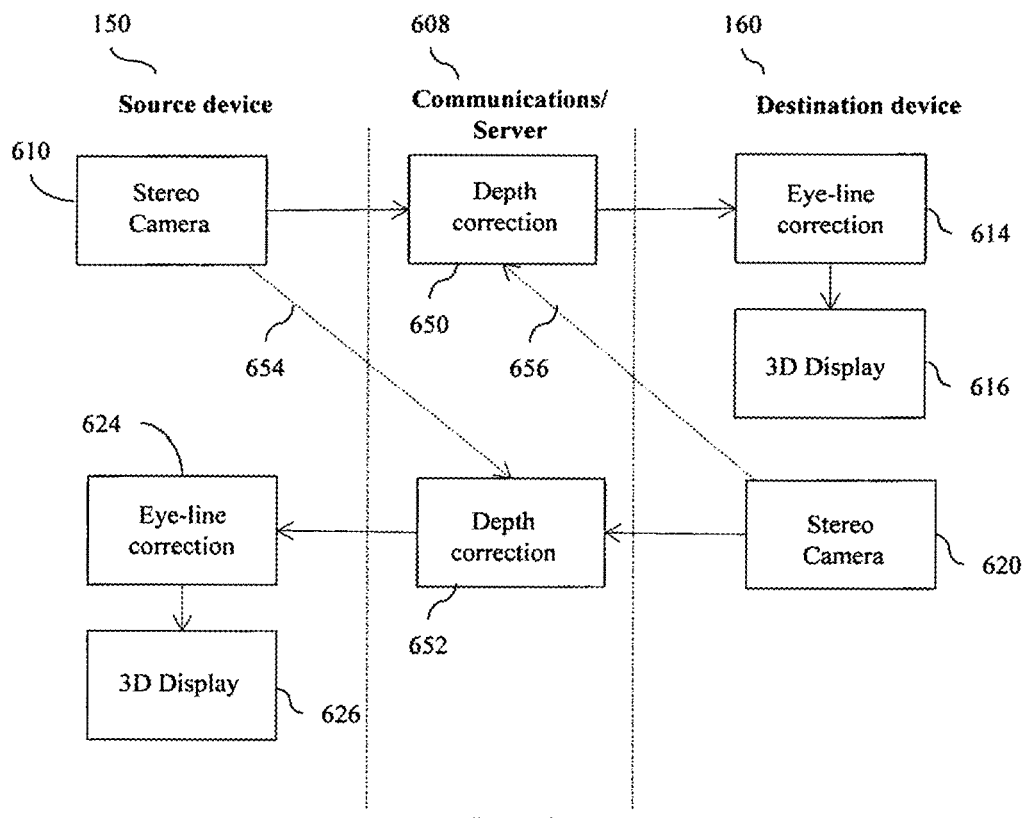
Figure 39:
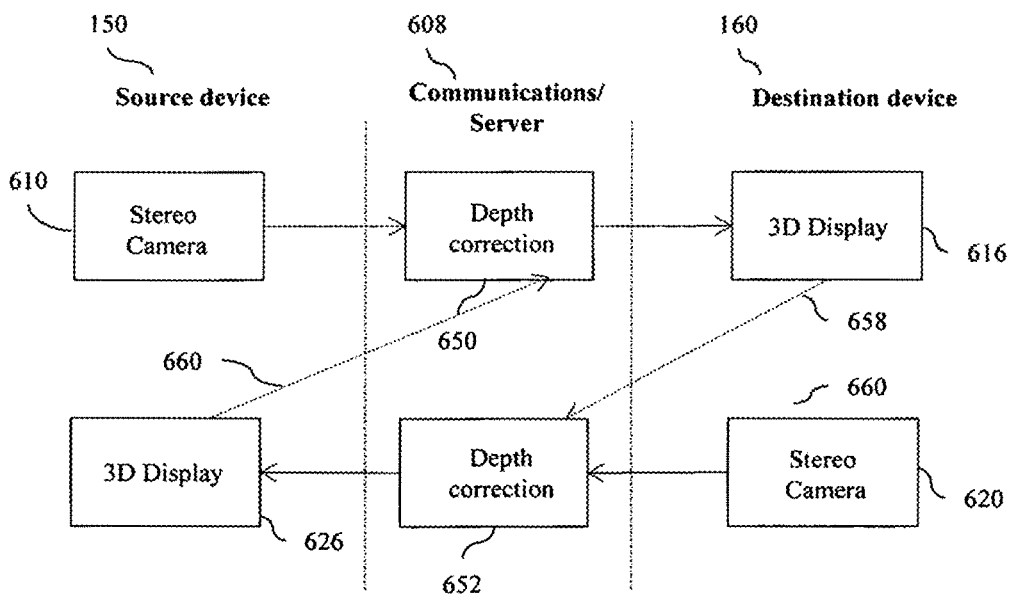

Alternatively, some or all of the processing may be performed in a server in the telecommunication network 199 through which the images are transmitted. Some non-limitative examples of this are shown in FIGS. 38-39 which are further schematic diagrams illustrating communication between source and destination telecommunication devices 150 and 160 through a communications server 608 in the telecommunication network 199 arranged to achieve correction of the position of delivery and return images. The communications server 608 may be located at a remote location to either or both the source and destination telecommunication devices 150 and 160. In these embodiments the communications server 608 is arranged to perform the face detection operations for delivery and return images in processing sections 650, 652 implemented in the communications server 608 with data 654, 656 transmitted to face detection modules determining camera line 170 location in source and destination devices respectively.

The step of shifting the images may be performed in depth correctors 624, 614 of the source and destination telecommunication devices 150 and 160 as shown in FIG. 38, or in the processing sections 650, 652 of the communications server 608 as shown in FIG. 39. In the latter case, data 658, 660 may be provided to the processing sections 650, 652 respectively to determine display location with respect to stereo camera line 170. Advantageously, the cost and complexity of the telecommunications devices may be reduced.

It has been appreciated that to optimize the quality of human social interaction in a telecommunications system in which images are displayed autostereoscopically, it is possible to minimize distortion of head shape due to the geometry of the delivery image capture and replay environments. In particular, it is desirable to achieve roundness of reproduction, that is the ratio between lateral and longitudinal magnification is approximately 1:1 in the region of viewing interest.

The image processing performed in steps may be performed in any device or any combination of devices of the telecommunication system through which the delivery images pass, including without limitation the source telecommunication device 150, the destination telecommunication device 160 or a server in the telecommunication network 199 through which the images are transmitted. The autostereoscopic display devices and may be any type of display device that is capable of displaying stereo images without additional equipment worn by the observer. Non-limitative examples of types of display device that are suitable for the autostereoscopic display of the present embodiments include but are not limited to wedge display devices, lenticular display devices, parallax barrier display devices, beam splitter display devices and light line display devices.

As an alternative, the autostereoscopic display device could be replaced by a stereoscopic display device. Stereoscopic display devices may include but are not limited to micropolarizer display devices, film patterned retarder display devices or shutter glasses display devices. Stereoscopic display devices rely on head-mounted equipment such as a pair of glasses to provide the stereoscopic effect, so the visibility of the relative iris and sclera positions of observer eyes may be compromised.

The autostereoscopic display devices 152 and 162 may be time multiplexed, that is providing the left and right images to the left and right eyes in a time multiplexed manner. Time multiplexed autostereoscopic display devices can advantageously improve the spatial resolution of autostereoscopic display device by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display device over multiple time slots. Time multiplexed display devices can advantageously achieve directional illumination by directing an illuminator array through a substantially transparent time multiplexed spatial light modulator using directional optical elements, wherein the directional optical elements substantially form an image of the illuminator array in the window plane.

The various features of the above described embodiments may be combined together in any combination.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of adjusting perceived roundness in a stereoscopic pair of images that image a head, the method comprising processing one or each image by the following steps:
   identifying, by a computer apparatus, at least one region of the image that images a part of the head; and
   locally transforming, by the computer apparatus, the at least one region in a manner that adjusts the perceived local depth in accordance with expected local depth in the imaged part of the head,
   wherein the at least one region of the image includes a reference feature between first and second head features, and
   wherein the transforming of the at least one region includes:
     translating pixels of the at least one region in a first direction in a first image of the pair of images and in a second direction in a second image of the pair of images; and
     resampling pixels of a second region adjacent the at least one region in both of the pair of images, the resampling including shifting pixels by respective distances that vary depending on respective distances from the at least one region.

2. A method according to claim 1, wherein the step of locally transforming the at least one region is performed in a manner that adjusts the perceived local depth by adjusting the disparity between the stereoscopic pair of images.

3. A method according to claim 1, wherein the step of locally transforming the at least one region is performed in a manner that adjusts the perceived local depth by re-sampling parts of a region that are occluded in the other image.

4. A method according to claim 1, wherein the at least one region of the image includes a nasal region that images a part of the head including the nose.

5. A method according to claim 4, wherein
   the step of identifying the nasal region further comprises identifying a nasal end region that images the end of the nose, the nasal region encompassing the nasal end region, and
   the step of locally transforming the nasal region comprises:
     translating the nasal end region; and
     re-sampling an outer region of the nasal region outside the nasal end region.

6. A method according to claim 4, wherein the step of locally transforming the nasal region comprises:
   detecting image features from the image;
   on the basis of the detected image features, selecting a transformation from a stored set of transformations of the nasal region; and
   performing the selected transformation.

7. A method according to claim 1, wherein the at least one region of the image includes a side region that images the side of the head closest to the image capture position of the image and extends to a boundary at the extremity of the head in the image.

8. A method according to claim 7, wherein the step of locally transforming the side region comprises:
   translating the boundary of the side region at the extremity of the head in the image; and
   re-sampling the side region.

9. A method according to claim 8, wherein the step of locally transforming the side region comprises:
   filling the background of the image that is uncovered by re-sampling a region of the background outside the boundary of the side region.

10. A method according to claim 1, wherein the step of identifying at least one region of the image comprises:
    detecting facial features of the imaged head in the image; and
    identifying the at least one region in relation to the detected facial features.

11. A method according to claim 1, wherein said step of processing one or each image comprises processing each image.

12. A method according to claim 1, wherein the step of locally transforming the at least one region is performed in a manner that adjusts the perceived local depth by reducing the magnitude of the disparity between the stereoscopic pair of images by an amount that depends on the magnitude of an expected depth in the imaged part of the head with respect to a reference feature of the head, and wherein a larger magnitude of the expected depth in the imaged part of the head with respect to the reference feature of the head results in a greater reduction of the magnitude of the disparity between the stereoscopic pair of images.

13. A method according to claim 12, wherein the reference feature is the eyes of the head.

14. A method according to claim 12, wherein the reference feature is the outside of the cheeks of the head.

15. A method according to claim 12, further comprising, after said processing of one or both of the images, stereoscopically displaying the stereoscopic pair of images with an overall disparity between the stereoscopic pair of images that provides a disparity of zero between the stereoscopic pair of images for the reference feature of the head.

16. A method according to claim 12, further comprising, after said processing of one or both of the images, stereoscopically displaying the stereoscopic pair of images.

17. A method according to claim 15, wherein said step of stereoscopically displaying the stereoscopic pair of images comprises stereoscopically displaying the stereoscopic pair of images on a destination telecommunication device to which the stereoscopic pair of images are transmitted over a telecommunication network.

18. A method according to claim 1, further comprising, before said processing of one or both of the images, capturing the stereoscopic pair of images.

19. A method according to claim 17, wherein said step of capturing the stereoscopic pair of images comprises capturing the stereoscopic pair of images on a source telecommunication device which transmits the stereoscopic pair of images over a telecommunication network.

20. A non-transitory computer readable medium storing a computer-executable program, the computer-executable program, when executed, causing a computer apparatus to adjust a stereoscopic pair of images that image a head by performing the following steps:
   processing one or each image by the following steps:
      identifying at least one region of the image that images a part of the head; and
      locally transforming the at least one region in a manner that adjusts the perceived local depth in accordance with expected local depth in the imaged part of the head,
   wherein the at least one region of the image includes a reference feature between first and second head features, and
   wherein the transforming of the at least one region includes:
      translating pixels of the at least one region in a first direction in a first image of the pair of images and in a second direction in a second image of the pair of images; and
      resampling pixels of a second region adjacent the at least one region in both of the pair of images, the resampling including shifting pixels by respective distances that vary depending on respective distances from the at least one region.

21. A device for adjusting perceived roundness in a stereoscopic pair of images that image a head, the device comprising at least one computer apparatus arranged to process one or each image by:
   identifying, by the computer apparatus, at least one region of the image that images a part of the head;
   locally transforming, by the computer apparatus, the at least one region in a manner that adjusts the perceived local depth in accordance with expected local depth in the imaged part of the head,
   wherein the at least one region of the image includes a reference feature between first and second head features, and
   wherein the transforming of the at least one region includes:
      translating pixels of the at least one region in a first direction in a first image of the pair of images and in a second direction in a second image of the pair of images; and
      resampling pixels of a second region adjacent the at least one region in both of the pair of images, the resampling including shifting pixels by respective distances that vary depending on respective distances from the at least one region.

22. A device according to claim 21, wherein the device is communicatively coupled via a telecommunications network.

* * * * *